US011496012B2

(12) United States Patent
Kim et al.

(10) Patent No.: US 11,496,012 B2
(45) Date of Patent: Nov. 8, 2022

(54) STATOR AND MOTOR INCLUDING SAME

(71) Applicant: LG INNOTEK CO., LTD., Seoul (KR)

(72) Inventors: Bong Geon Kim, Seoul (KR); Young Gu Kang, Seoul (KR); Tae Ho Kim, Seoul (KR); Ja Young Seo, Seoul (KR); Jin Su Pyeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 131 days.

(21) Appl. No.: 16/954,890

(22) PCT Filed: Dec. 13, 2018

(86) PCT No.: PCT/KR2018/015835
§ 371 (c)(1),
(2) Date: Jun. 17, 2020

(87) PCT Pub. No.: WO2019/132338
PCT Pub. Date: Jul. 4, 2019

(65) Prior Publication Data
US 2020/0395806 A1    Dec. 17, 2020

(30) Foreign Application Priority Data

Dec. 26, 2017  (KR) .................. 10-2017-0179366
Jan. 18, 2018  (KR) .................. 10-2018-0006571
Sep. 21, 2018  (KR) .................. 10-2018-0114080

(51) Int. Cl.
*H02K 3/34*        (2006.01)
*H02K 1/14*        (2006.01)
(Continued)

(52) U.S. Cl.
CPC ............... *H02K 3/34* (2013.01); *H02K 1/146* (2013.01); *H02K 3/325* (2013.01); *H02K 3/345* (2013.01); *H02K 5/225* (2013.01); *B62D 5/04* (2013.01)

(58) Field of Classification Search
CPC .......... H02K 3/34; H02K 1/146; H02K 3/325; H02K 3/522; H02K 2203/12; H02K 1/04;
(Continued)

(56) References Cited

U.S. PATENT DOCUMENTS 9,748,812 B2     8/2017  Kim et al.
2009/0289520 A1* 11/2009  Takeshita ............... H02K 3/487
                                                          310/214

(Continued)

FOREIGN PATENT DOCUMENTS

EP      1 215 801 A2    6/2002
JP      2011-135640 A   7/2011
(Continued)

OTHER PUBLICATIONS

Supplementary European Search Report dated Jan. 15, 2021 in European Application No. 18894716.2.
(Continued)

*Primary Examiner* — Alexander A Singh
(74) *Attorney, Agent, or Firm* — Saliwanchik, Lloyd & Eisenschenk

(57) ABSTRACT

An embodiment relates to a stator and a motor including the stator, the stator comprising: a stator core; a coil wound around the stator core; and an insulator disposed between the stator core and the coil, wherein the insulator includes: a body around which the coil is wound; a first guide protruding from the inside of the body; a second guide protruding on the outside of the body a first protrusion protruding outward from the lateral surface of the first guide; and a second protrusion protruding inward from the inner surface of the second guide, and an insulating member radially disposed between the first guide and the second guide is bent in a circumferential direction by means of the first protrusion
(Continued)

and the second protrusion. Therefore, the motor can inhibit the movement and separation of insulating paper.

20 Claims, 32 Drawing Sheets

(51) Int. Cl.
　　*H02K 3/32*　　　(2006.01)
　　*H02K 5/22*　　　(2006.01)
　　*B62D 5/04*　　　(2006.01)
(58) Field of Classification Search
　　CPC .......... H02K 3/345; H02K 1/12; H02K 5/225;
　　　　　　　H02K 1/14; H02K 3/12; H02K 3/48;
　　　　　　　H02K 3/487; B62D 5/04
　　USPC .................................................. 310/215, 214
　　See application file for complete search history.

(56) References Cited

U.S. PATENT DOCUMENTS

2012/0080976 A1\* 4/2012 Oka ...................... H02K 3/522
　　　　　　　　　　　　　　　　　　　　310/215
2013/0313921 A1\* 11/2013 Hoffman ................ H02K 1/148
　　　　　　　　　　　　　　　　　　　　310/43
2015/0171692 A1\* 6/2015 Juretko .................. H02K 3/345
　　　　　　　　　　　　　　　　　　　　310/215

FOREIGN PATENT DOCUMENTS

| JP | 2014-103712 A | 6/2014 |
| JP | 2015-91146 A | 5/2015 |
| KR | 20-0402555 Y1 | 12/2005 |
| KR | 10-2017-0053249 A | 5/2017 |
| KR | 10-2017-0102018 A | 9/2017 |
| WO | WO-2012/169059 A1 | 12/2012 |
| WO | WO-2016/132494 A1 | 8/2016 |

OTHER PUBLICATIONS

International Search Report in International Application No. PCT/KR2018/015835, filed Dec. 13, 2018.
Office Action dated Aug. 4, 2022 in Korean Application No. 10-2018-0006571.

\* cited by examiner

STATOR AND MOTOR INCLUDING SAME

CROSS-REFERENCE TO RELATED APPLICATIONS

This application is the U.S. national stage application of International Patent Application No. PCT/KR2018/015835, filed Dec. 13, 2018, which claims the benefit under 35 U.S.C. § 119 of Korean Application Nos. 10-2017-0179366, filed Dec. 26, 2017; 10-2018-0006571, filed Jan. 18, 2018; and 10-2018-0114080, filed Sep. 21, 2018; the disclosures of each of which are incorporated herein by reference in their entirety.

TECHNICAL FIELD

Embodiments relate to a stator and a motor including the same.

BACKGROUND ART

Motors are devices obtaining rotational forces by converting electrical energy into mechanical energy and are widely used in vehicles, household appliances, industrial equipment, and the like.

The motor may include a housing, a shaft, a stator disposed on an inner circumferential surface of the housing, and a rotor installed on an outer circumferential surface of the shaft. Here, the stator of the motor causes an electrical interaction of the rotor to induce rotation of the rotor.

Here, the stator may include a stator core, a coil wound around the stator core, and an insulator disposed between the stator core and the coil. In addition, the stator may further include an insulating paper disposed between the coils.

In this case, since the insulating paper is disposed in a state in which the stator is assembled with the housing, it is difficult to assemble the insulating paper at a uniform position.

In addition, when a space is formed between the coils, there is a problem in that the insulating paper is moved or separated. Consequently, there is a problem in that insulating performance due to the insulating paper is degraded.

In addition, when the insulating paper is separated, there is a problem in that rotation of the rotor is interfered with due to the insulating paper. Accordingly, the separated insulating paper increases a probability of a defect of the motor.

In addition, the stator core includes a yoke and teeth protruding inward from the yoke. The coil is wound around the teeth. In addition, a space between the teeth corresponds to a slot in which the wound coil is accommodated. Here, in the case of a series winding, a diameter of the coil is relatively larger than that of a parallel winding. Therefore, after the coil is wound around the tooth, the coil wound by a last turn passing over another tooth has a problem of causing interference with a coil disposed in an adjacent slot.

DISCLOSURE

Technical Problem

Embodiments are directed to providing a stator and a motor so as to inhibit movement and separation of an insulating paper.

In addition, the embodiments are directed to providing a motor which removes interference with coils wound around an adjacent tooth.

It should be noted that objects of the embodiments are not limited to the foregoing objects, and other objects of the embodiments will be apparent to those skilled in the art from the following descriptions.

Technical Solution

One aspect of the present invention provides a motor including a shaft, a rotor coupled to the shaft, and a stator disposed at an outer side of the rotor, wherein the stator includes a stator core, an insulator coupled to the stator core, a coil disposed on the insulator, and an insulating member disposed at one side of the coil, wherein the insulator includes a body, a first guide disposed at one side of the body, a second guide disposed at the other side of the body, a first protrusion formed on one side of the first guide, and a second protrusion formed on one side of the second guide, and one side of the insulating member is disposed between the first protrusion and the coil, and the other side thereof is disposed between the second protrusion and the coil.

Another aspect of the present invention provides a motor including a shaft, a rotor coupled to the shaft, and a stator disposed at an outer side of the rotor, wherein the stator includes a plurality of unit stators, at least one unit stator among the plurality of unit stators including a stator core, an insulator coupled to the stator core, and a coil disposed on the insulator, the insulator includes a body, a first guide disposed at one side of the body, a second guide disposed at the other side of the body, a first protrusion formed on one side of the first guide, and a second protrusion formed on one side of the second guide, and the first protrusion and the second protrusion protrude in directions facing each other. The motor may further include an insulating member disposed at one side of the coil.

The plurality of unit stators may be arranged in a circular shape to form the stator, and the first protrusion and the insulating member may be disposed in a clockwise direction with respect to the unit stator.

The insulating member may include a curved surface.

The insulating member may include a region in which a curvature of the curved surface is decreased in a direction away from a center of the stator core in a radial direction.

One surface of the first protrusion in contact with the insulating member may include a first curved surface corresponding to the curvature of the insulating member, and one surface of the second protrusion in contact with the insulating member may include a second curved surface corresponding to the curvature of the insulating member.

A curvature of the first curved surface may be greater than that of the second curved surface.

The insulating member may be disposed farther outward than the coil wound around an outermost side of the body with respect to a circumferential direction.

A gap (G) between one region of the coil wound around an outer side of the body by a last turn and an end portion of the second protrusion may be 0.95 to 1.0 times a diameter of the coil.

The first protrusion may be disposed to face the second protrusion.

The first protrusion and the second protrusion may be located in the same circumferential direction with respect to the body.

The first protrusion and the second protrusion may be in contact with the insulating member.

The second protrusion may be disposed on an imaginary line connecting a center of the stator core to one end of the first protrusion.

An upper surface of the body, an upper surface of the first protrusion, and an upper surface of the second protrusion may be disposed coplanar with each other. An upper portion of the insulating member may be disposed below the upper surface of the first protrusion.

The first protrusion may be formed as a plurality of first protrusions, the second protrusion may be formed as a plurality of first protrusions, the plurality of first protrusions may be disposed at an upper side and a lower side of the first guide, and the plurality of second protrusions may be disposed at an upper side and a lower side of the second guide.

The first protrusion and the second protrusion may be formed to extend to be long in a vertical direction. Inner surfaces of the first protrusion and the second protrusion, which are in contact with the insulating member, have a slope inclined at a predetermined angle.

A radial direction length of the insulating member may be greater than a distance (D1) between the first guide and the second guide.

The insulating member may be provided as an insulating paper.

Still another aspect of the present invention provides a stator including a stator core, a coil wound around the stator core, and an insulator disposed between the stator core and the coil, wherein the insulator includes a body around which the coil is wound, a first guide protruding from an inner side of the body, a second guide protruding from an outer side of the body, a first protrusion protruding outward from a side surface of the first guide, and a second protrusion protruding inward from an inner surface of the second guide, and wherein an insulating member disposed between the first guide and the second guide in a radial direction is curved in a circumferential direction due to the first protrusion and the second protrusion.

The first protrusion may include a first curved surface so that an inner end portion of the insulating member is in contact with the first curved surface, and the second protrusion may include a second curved surface so that an outer end portion of the insulating member is in contact with the second curved surface.

A corner at which the second curved surface and the second guide meet may be disposed on an imaginary line L radially connecting a corner at which a center of the stator core, the first curved surface, and the first guide meet.

A gap (G) between one region of the coil wound around an outer side of the body by a last turn and an end portion of the second protrusion may be 0.95 to 1.0 times a diameter of the coil.

The insulating member may be formed in a plate shape, and as a radial direction width of the insulating member is increased, a protruding length of the first protrusion may be reduced.

An upper surface of the body, an upper surface of the first protrusion, and an upper surface of the second protrusion may be disposed coplanar with each other. An upper portion of the insulating member may be disposed below the upper surface of the first protrusion.

The insulating member may be provided as an insulating paper.

The radial direction length of the insulating member may be greater than a distance (D1) between the first guide and the second guide.

Yet another aspect of the present invention provides a motor including a shaft, a rotor coupled to the shaft, and a stator disposed at an outer side of the rotor, wherein the stator includes a stator core, a coil wound around the stator core, and an insulator disposed between the stator core and the coil, wherein the insulator includes a body around which the coil is wound, a first guide protruding from an inner side of the body, a second guide protruding from an outer side of the body, a first protrusion protruding outward from the first guide, and a second protrusion protruding inward from the second guide, and wherein an insulating member disposed between the first guide and the second guide in a radial direction is curved in a circumferential direction due to the first protrusion and the second protrusion.

Still yet another aspect of the present invention provides a stator including a plurality of stator units, an insulating member configured to insulate the stator units, and a first guide portion configured to guide an arrangement of the insulating member, wherein each of the stator units includes a stator core, an insulator disposed on the stator core, and a coil wound around the insulator, wherein the insulator includes a main body around which the coil is wound, an inner guide protruding from an inner side of the main body, an outer guide protruding from an outer side of the main body, and a first protrusion protruding from one region of a side surface of the inner guide in a circumferential direction, and wherein the first guide portion is a groove which is formed due to the first protrusions disposed adjacent to each other which are in contact with each other.

The insulator may include a second protrusion protruding outward from a lower portion of the first protrusion, and an upper surface of the second protrusion may be in contact with a lower surface of the insulating member.

The insulator may include an upper insulator and a lower insulator, and the second protrusion may be formed at the lower portion of the first protrusion of the lower insulator.

The stator may further include a second guide portion for guiding an arrangement of the insulating member, and the second guide portion may be provided as a slit formed due to side surfaces of the outer guides disposed adjacent to each other which are disposed to be spaced apart from each other.

The insulator may include a third protrusion protruding from one region of a lower side of the side surface of the outer guide in the circumferential direction.

An upper surface of the third protrusion may be in contact with a lower surface of the insulating member.

The insulating member may be formed in a plate shape and guided by the first guide portion and the second guide portion.

The stator core may include a yoke and a tooth radially protruding from the yoke, and an outer surface of the insulating member may be in contact with an inner circumferential surface of the yoke.

The insulating member may include a plate portion and side wall portions extending from both side ends of the plate portion, and the side wall portion may be guided by the first guide portion and the second guide portion.

A height (H1) of an inner surface of the side wall portion may be smaller than a height (H2) of an outer surface thereof.

An inner width (W1) of the plate portion may be smaller than an outer width (W2) thereof.

The stator core may include a yoke and a tooth radially protruding from the yoke, and the outer surface of the insulating member may be in contact with the inner circumferential surface of the yoke.

The insulating member may be an insulating paper.

Yet still another aspect of the present invention provides a motor including a housing, a stator disposed in the housing, a rotor disposed on the stator, a shaft coupled to the rotor, and a cover disposed on the housing, wherein the stator includes a plurality of stator units, an insulating member configured to insulate the stator units, and a first guide portion configured to guide an arrangement of the insulating member, wherein each of the stator units includes a stator core, an insulator disposed on the stator core, and a coil wound around the insulator, wherein the insulator includes a main body around which the coil is wound, an inner guide protruding from an inner side of the main body, an outer guide protruding from an outer side of the main body, and a first protrusion protruding from one region of a side surface of the inner guide in a circumferential direction, and wherein the first guide portion is a groove which is formed due to the first protrusions disposed adjacent to each other which are in contact with each other.

The stator may further include a second guide portion for guiding an arrangement of the insulating member, and the second guide portion may be provided as a slit formed due to side surfaces of the outer guides disposed adjacent to each other which are disposed to be spaced apart from each other.

Yet still another aspect of the present invention provides a motor including a housing, a stator disposed in the housing, a rotor disposed on the stator, and a shaft coupled to the rotor, and wherein the stator includes a stator core having a plurality of teeth, an insulator disposed on the teeth, and a coil wound around the insulator, wherein the insulator includes a winding portion, an outer guide disposed at an outer side of the winding portion, and a groove disposed at an inner side of the outer guide, and wherein the coil is wound around the winding portion in a plurality of turns to form a plurality of layers, a last turn among the plurality of turns of the coil is disposed in a first layer closest to the teeth among the plurality of layers, and the coil in the last turn is disposed in the groove.

The winding portion may include an upper surface and two side surfaces extending from both ends of the upper surface, and the groove may be disposed adjacent to a boundary between the side surface and the winding portion.

The winding portion may include an upper surface and two side surfaces extending from both ends of the upper surface, and the groove may be disposed at a boundary between the side surface and the winding portion.

The number of turns of the coil may be six, and the three coils may be connected in series.

When the number of teeth constituting the stator is n and the number of coils constituting the stator is m, one coil may be wound around n/m teeth (each of n and m is a positive integer).

A first turn and a last turn among the plurality of turns may be symmetrically disposed with respect to the teeth.

The first turn and the last turn of the coil wound around the winding portion of the teeth may be disposed in the same layer among the plurality of layers.

A width of the groove may be smaller than a diameter of the coil.

The insulator may include an upper insulator disposed above the teeth and a lower insulator disposed below the teeth, and the groove may be disposed in either the upper insulator or the lower insulator.

Advantageous Effects

In accordance with embodiments of the present invention, a stator and a motor including the same can inhibit the movement and separation of an insulating member by adjusting a distance between an insulator and a guide and a size of the insulating member to give insulating member an elastic force.

In addition, in accordance with embodiments of the present invention, the stator and the motor including the same can inhibit the movement and separation of the insulating member using a protrusion formed in the insulator.

In this case, in consideration of a line diameter of a coil and tension applied to the coil, an arrangement relationship between the coil and a second protrusion formed in a second guide of the insulator is defined so that it is possible to improve a space factor of the coil. Therefore, separation of an end portion of the coil can be inhibited through the arrangement relationship.

Further, in accordance with the embodiments of the present invention, the stator and the motor including the same can inhibit the movement and separation of an insulating paper using a first guide portion and a second guide portion.

In addition, in accordance with the embodiments of the present invention, since a last turn of the coil is disposed in a first layer and fixed through a groove of the insulator, there is provided an advantageous effect of removing interference with a coil wound around an adjacent tooth.

Various beneficial advantages and effects of the embodiments are not limited by the detailed description and should be easily understood through detailed descriptions of the embodiments.

MODES OF THE INVENTION

Figure 1:
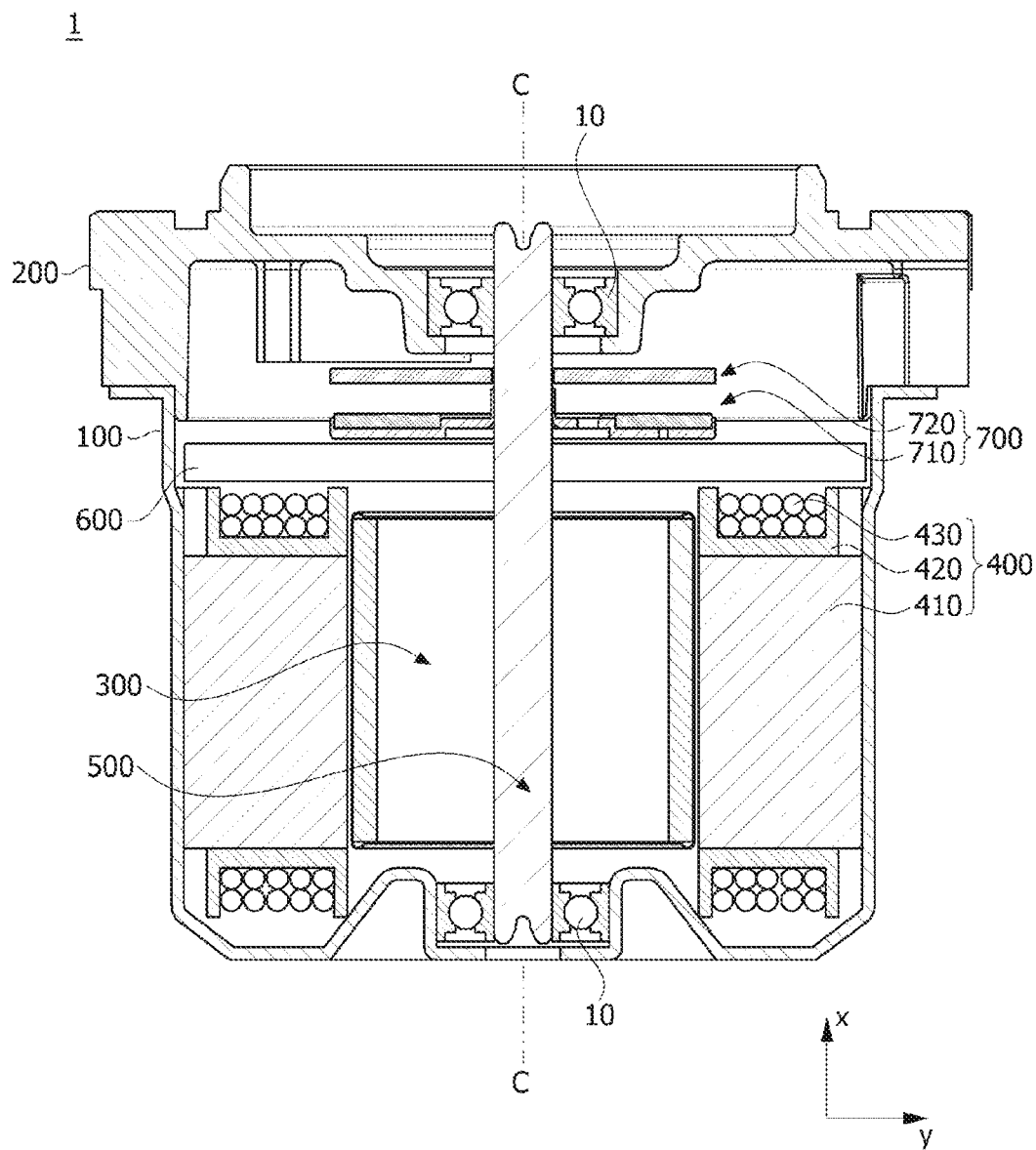
FIG. 1 is a diagram illustrating a motor according to a first embodiment.

Hereinafter, exemplary embodiments of the present invention will be described in detail with reference to the accompanying drawings.

However, the technical idea of the present invention is not limited to some embodiments described below but may be implemented in various different forms, and one or more components between the embodiments may be selectively combined and substituted without departing from the technical scope of the present invention.

Further, unless specifically defined and described, terms used in the embodiments of the present invention (including technical and scientific terms) may be construed as meanings which are generally understood by those skilled in the art to which the present invention pertains, and generally used terms such as terms defined in the dictionary may be interpreted in consideration of the contextual meaning of the related art.

In addition, terms used in the embodiments of the present invention are intended to describe the embodiments and are not intended to limit the present invention.

In this disclosure, the singular forms may include the plural forms unless the context clearly dictates otherwise, and, when described as "at least one (or one or more) among A, B, and (or) C," it may include one or more of all combinations in which A, B, and C can be combined.

In addition, in describing components of the embodiments of the present invention, the terms first, second, A, B, (a), (b), and the like can be used.

These terms are intended to distinguish one component from other components, but the nature and the order or sequence of the components is not limited by those terms.

In addition, when a component is described as being "linked," "coupled," or "connected" to another component, the component is not only directly linked, coupled, or connected to another component, but also "linked," "coupled," or "connected" to another component due to still another component between the component and another component.

Further, when two components are described as being formed or disposed "on (above) or below (under)" of each component, the term on (above) or below (under) includes not only when the two components are in direct contact with each other, but also when one or more other components are formed or disposed between the two components. Also, when described as being "on (above) or below (under)," the term "on (above) or below (under)" may mean not only an upward direction but also a downward direction with respect to one component.

Hereinafter, embodiments of the present invention will be described in detail with reference to the accompanying drawings, the same reference numerals are given to the same or corresponding components regardless of a number of the drawing, and duplicate descriptions thereof will be omitted herein.

First Embodiment

FIG. 1 is a diagram illustrating a motor according to a first embodiment. In FIG. 1, an X-direction means a shaft direction, and a Y-direction means a radial direction. In addition, the shaft direction is perpendicular to the radial direction.

Referring to FIG. 1, a motor 1 according to the first embodiment may include a housing 100 with an opening formed at one side thereof, a cover 200 disposed on an upper portion of the housing 100, a rotor 300 coupled to a shaft 500, a stator 400 disposed in the housing 100, the shaft 500 rotated together with the rotor 300, a bus bar 600 disposed above the stator 400, and a sensor part 700 for detecting rotation of the rotor 300. In this case, the rotor 300 is rotatably disposed at an inner side of the stator 400. Here, the inner side for arrangement means a direction toward a center C with respect to the center C, and an outer side means a direction opposite to the inner side.

The motor 1 may be a motor used in an electronic power steering (EPS) system. The EPS system assists a steering force by means of a driving force of the motor to ensure turning stability and rapidly provide a restoring force, thereby allowing a driver to drive safely.

The housing 100 and the cover 200 may form an outer shape of the motor 1. In addition, an accommodation space may be formed due to a coupling between the housing 100 and the cover 200. Thus, as shown in FIG. 1, the rotor 300, the stator 400, the shaft 500, the bus bar 600, and the sensor part 700 may be disposed in the accommodation space. In this case, the shaft 500 is rotatably disposed in the accommodation space. Thus, the motor 1 may further include a bearing 10 disposed on each of an upper portion and a lower portion of the shaft 500.

The housing 100 may be formed in a cylindrical shape. In addition, the rotor 300, the stator 400, and the like may be accommodated in the housing 100. In this case, a shape or a material of the housing 100 may be variously modified. For example, the housing 100 may be formed of a metal material which may withstand high temperatures.

The cover 200 may be disposed on an opening surface of the housing 100, that is, on the upper portion of the housing 100, so as to cover an opening of the housing 100. In this case, a shape or a material of the cover 200 may be variously modified. For example, the cover 200 may be formed of a metal material which may withstand high temperatures.

The rotor 300 may be disposed at an inner side of the stator 400. In addition, the shaft 500 may be coupled to a central portion of the rotor 300 by a press-fit method.

The rotor 300 may be formed by coupling magnets (not shown) to a rotor core (not shown). For example, the rotor 300 may be formed as a type in which the magnets are disposed on an outer peripheral surface of the rotor core. Alternatively, the rotor 300 may be formed in an interior permanent magnet (IPM) type in which the magnets are disposed in the rotor core.

Thus, the magnets form a rotating magnetic field with respect to a coil 430 wound around the stator 400. These magnets may be disposed such that north (N) poles and south (S) poles are alternately disposed in a circumferential direction with respect to the shaft 500.

Accordingly, the rotor 300 rotates due to an electrical interaction between the coil 430 and the magnets, and, when the rotor 300 rotates, the shaft 500 is rotated to generate a driving force of the motor 1.

Meanwhile, the rotor core of the rotor 300 may be fabricated by coupling a plurality of divided cores or may be fabricated in the form of a single core formed as a single container. Here, the rotor core may be implemented in the form in which a plurality of plates having a shape of a circular thin steel plate are stacked.

In addition, the rotor 300 may further include a can (not shown) disposed to cover the rotor core having an outer circumferential surface to which the magnets are bonded.

The can may protect the rotor core and the magnets from an external impact, physical and chemical stimuli, and the like as well as may block foreign materials from being introduced into the rotor core and the magnets.

In addition, the can inhibits the magnets from being separated from the rotor core.

The stator 400 may be disposed in the housing 100. In this case, the stator 400 may be supported on an inner circumferential surface of the housing 100. In addition, the stator 400 is disposed at an outer side of the rotor 300. That is, the rotor 300 may be rotatably disposed at an inner side of the stator 400.

Figure 2:
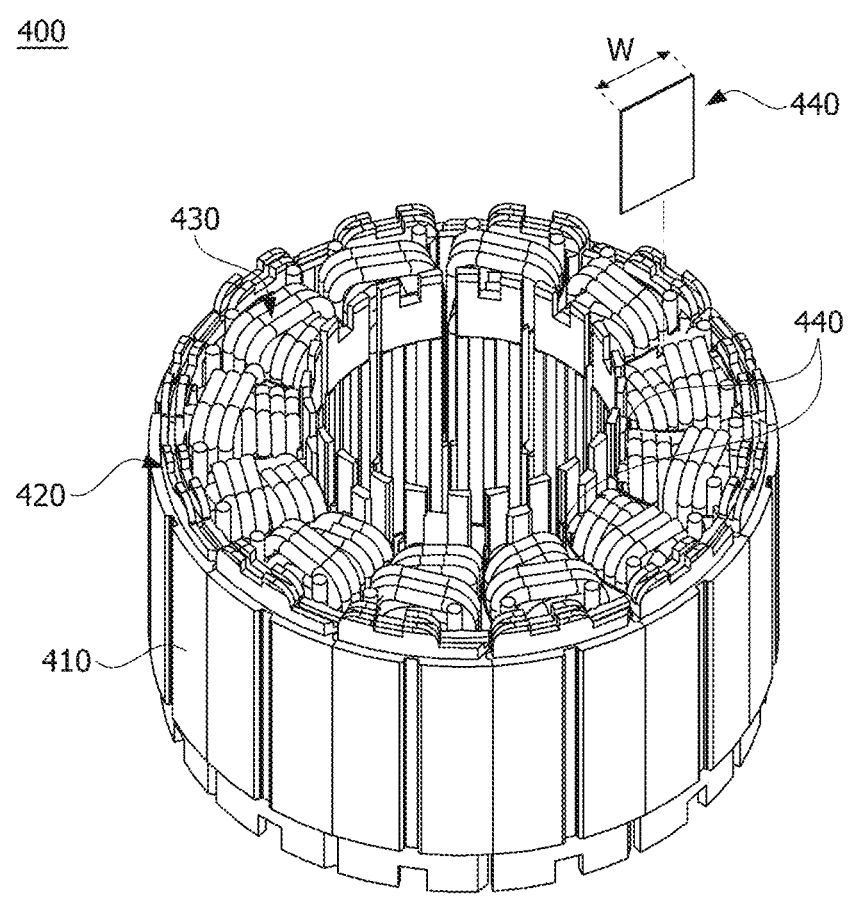
FIG. 2 is a perspective view illustrating a stator disposed in the motor according to the first embodiment.
Figure 3:
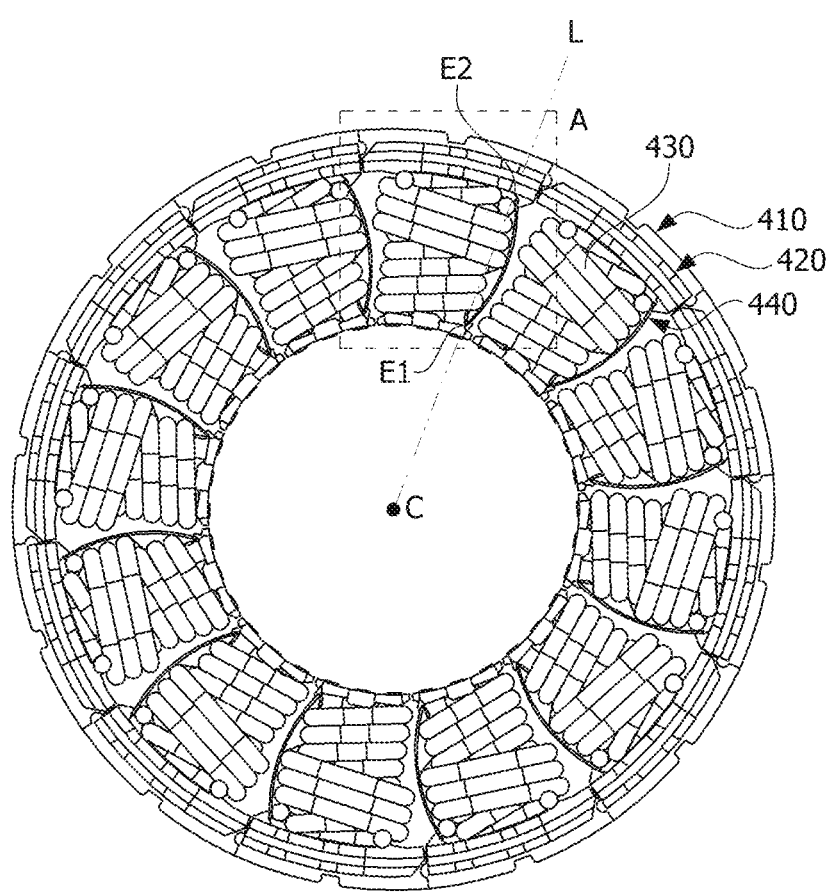
FIG. 3 is a plan view illustrating the stator disposed in the motor according to the first embodiment.
Figure 4:
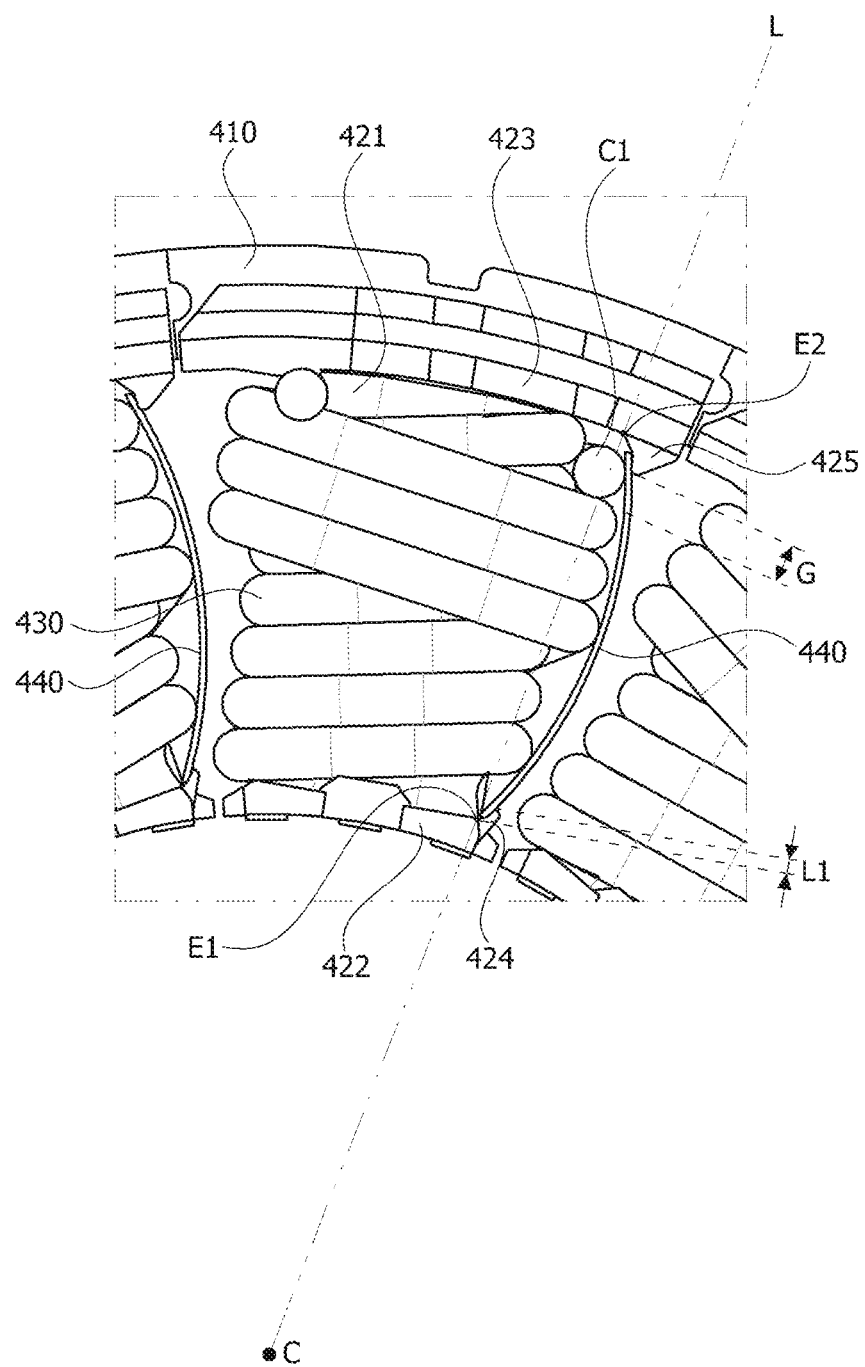
FIG. 4 is an enlarged view illustrating region A of FIG. 3.
Figure 5:
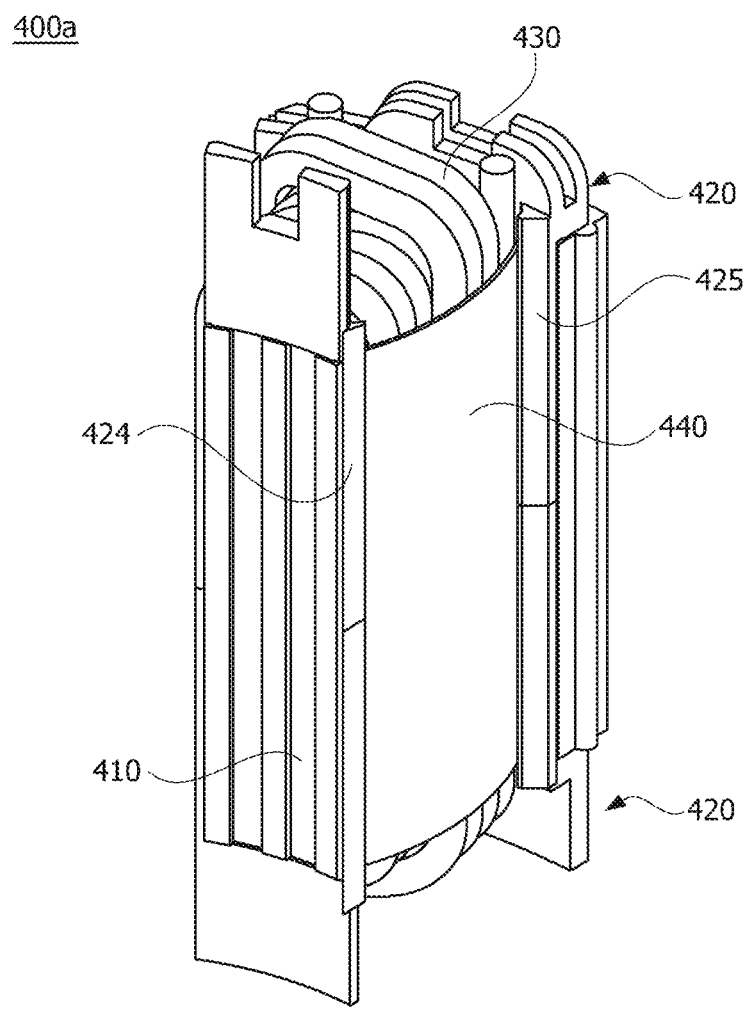
FIG. 5 is a diagram illustrating a unit stator of the stator disposed in the motor according to the first embodiment.
Figure 6:
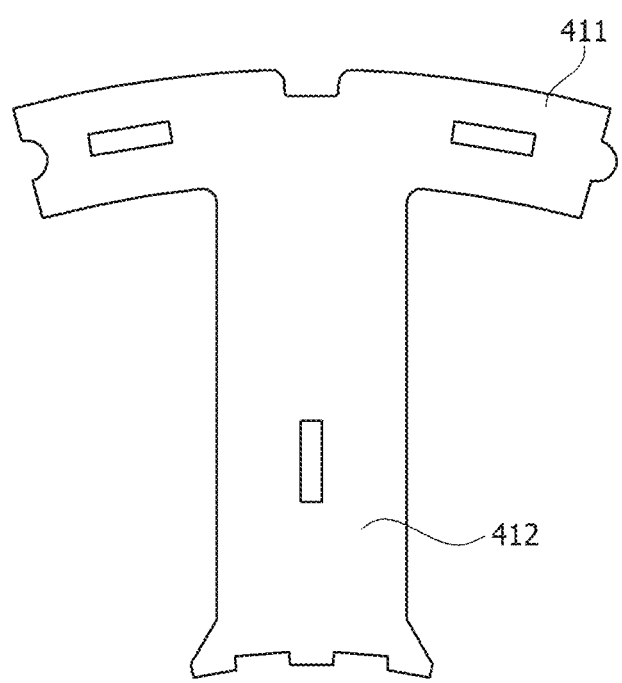
FIG. 6 is a plan view illustrating a stator core of the stator disposed in the motor according to the first embodiment.

FIG. 2 is a perspective view illustrating a stator disposed in the motor according to the first embodiment, FIG. 3 is a plan view illustrating the stator disposed in the motor according to the first embodiment, FIG. 4 is an enlarged view illustrating region A of FIG. 3, FIG. 5 is a diagram illustrating a unit stator of the stator disposed in the motor according to the first embodiment, and FIG. 6 is a plan view illustrating a stator core of the stator disposed in the motor according to the first embodiment.

Referring to FIGS. 2 to 4, the stator 400 may include a stator core 410, an insulator 420 disposed on the stator core 410, coils 430 wound around the insulator 420, and an insulating member 440 disposed in a radial direction and configured to insulate between the coils 430 wound around teeth 412 of the stator core 410. Here, the insulator 420 is disposed between the teeth 412 and the coil 430 of the stator core 410 to insulate the coil 430.

In this case, the stator 400 may be formed by arranging unit stators 400a shown in FIG. 5 in a circumferential direction. For example, a plurality of unit stators 400a may be arranged in a circular shape to form the stator 400.

Here, the insulating member 440 is disposed between the coils 430 of the unit stator 400a to insulate the coil 430 of the unit stator 400a. For example, the insulating member 440 is disposed on one side of the coil 430 with respect to the circumferential direction to insulate between the coils 430. Accordingly, a first protrusion 424 and the insulating member 440 may be disposed in a clockwise direction or a counterclockwise direction with respect to the unit stator 400a.

An example of the stator 400 of the motor 1, which was formed by arranging the plurality of unit stators 400a in the circumferential direction, has been described, but the present invention is not necessarily limited thereto. For example, the insulator 420 is disposed on the stator core 410 which is provided as a single product, the coil 430 is wound around the insulator 420, and then the insulating member 440 is disposed so that the stator 400 may be formed. Here, the stator core 410 provided as a single product may include a cylindrical-shaped yoke, and a plurality of teeth disposed to be spaced apart from each other on an inner circumferential surface of the cylindrical-shaped yoke in the circumferential direction.

Referring to FIGS. 2 to 5, the stator 400 may include the stator core 410, the insulator 420 disposed on the stator core 410, the coil 430 wound around the insulator 420, and the insulating member 440 disposed in the radial direction and configured to insulate between the coils 430 wound around the teeth 412 of the stator core 410. In this case, since the stator 400 may be formed of a plurality of unit stators 400a, each of the unit stators 400a may also include the stator core 410, the insulator 420, the coil 430, and the insulating member 440.

The coil 430 forming a rotating magnetic field may be wound around the stator core 410.

Referring to FIG. 6, the stator core 410 may include a yoke 411 and the tooth 412 protruding radially from the yoke 411. Here, the stator core 410 may be formed by stacking a plurality of sheets having a shape of a thin steel sheet or a plurality of plates.

The yoke 411 may be formed in an arc shape.

The tooth 412 may be disposed to protrude radially from an inner circumferential surface of the yoke 411. Here, the plurality of teeth 412 of the stator 400 may be disposed to be spaced apart from each other in the circumferential direction.

In addition, the tooth 412 may be disposed to face the magnet of the rotor 300.

Further, the coil 430 may be wound around the tooth 412. In this case, a body 421 of the insulator 420 may be disposed between the tooth 412 and the coil 430 to insulate the tooth 412 from the coil 430.

The insulator 420 may be formed of a synthetic resin material to insulate the stator core 410 from the coil 430. In addition, the coil 430 may be wound around the tooth 412 of the stator core 410 in which the insulator 420 is disposed. Accordingly, the coil 430 may form a rotating magnetic field due to a supply of power.

The insulator 420 may be coupled to an upper side and a lower side of the stator core 410.

Figure 7:
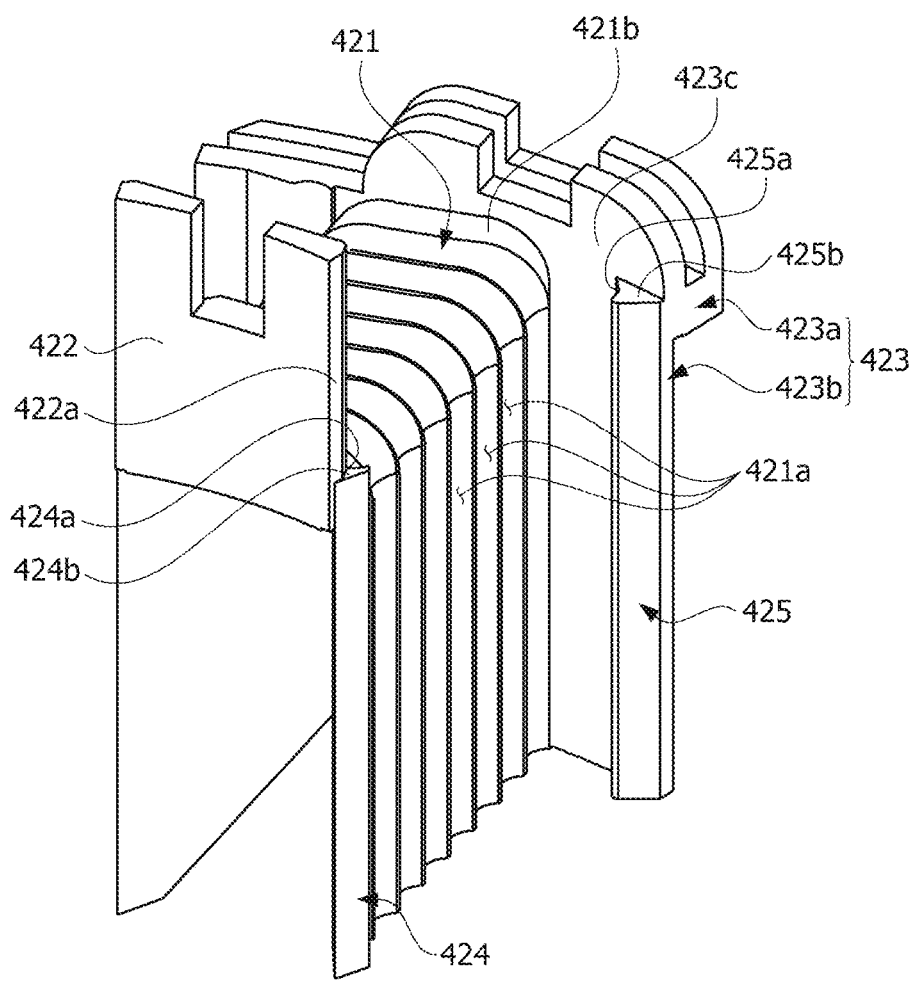
FIG. 7 is a perspective view illustrating an insulator of the stator disposed in the motor according to the first embodiment.
Figure 8:
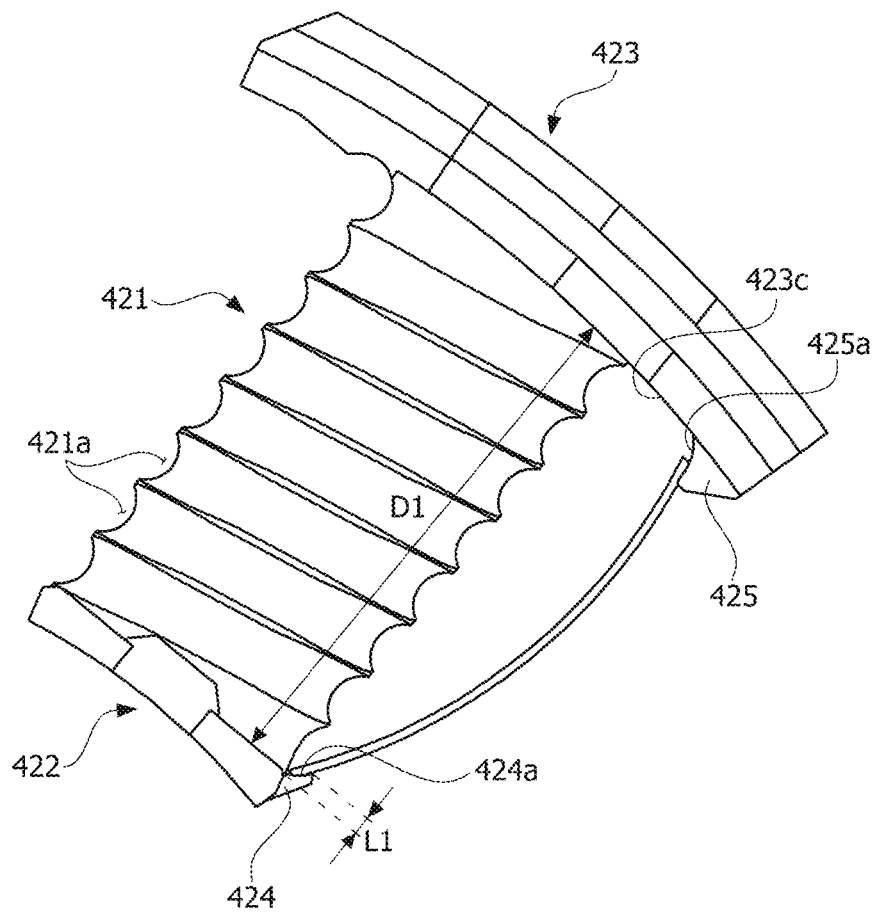
FIG. 8 is a plan view illustrating the insulator of the stator disposed in the motor according to the first embodiment.
Figure 9:
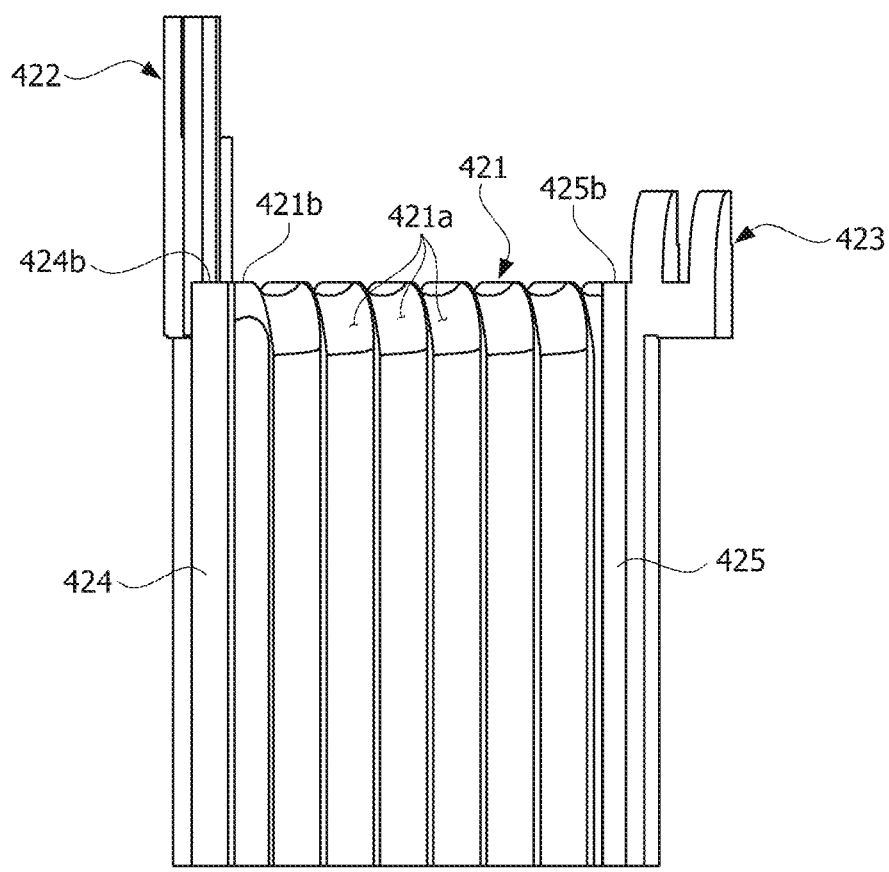
FIG. 9 is a side view illustrating the insulator of the stator disposed in the motor according to the first embodiment.

FIG. 7 is a perspective view illustrating an insulator of the stator disposed in the motor according to the first embodiment, FIG. 8 is a plan view illustrating the insulator of the stator disposed in the motor according to the first embodiment, and FIG. 9 is a side view illustrating the insulator of the stator disposed in the motor according to the first embodiment.

Referring to FIGS. 7 to 9, the insulator 420 may include the body 421 around which the coil 430 is wound, a first guide 422 extending from an inner side of the body 421 to protrude in the shaft direction, a second guide 423 extending from an outer side of the body 421 to protrude in the shaft direction, the first protrusion 424 protruding outward from the first guide 422, and a second protrusion 425 protruding inward from the second guide 423. Here, the first protrusion 424 may be disposed to face the second protrusion 425. Accordingly, the protruding directions of the first protrusion 424 and the second protrusion 425 may be opposite to each other. In this case, as shown in FIG. 3, the first protrusion 424 and the second protrusion 425 may be located in the clockwise direction of the same circumferential direction with respect to the body 421.

In this case, one side of the insulating member 440, which is disposed between the first guide 422 and the second guide 423, is disposed between the first protrusion 424 and the coil 430 wound around the body 421, and the other side thereof is disposed between the second protrusion 425 and the coil 430 wound around the body 421. Accordingly, the insulating member 440, which is disposed between the first guide 422 and the second guide 423, may be disposed to be curved due to the first protrusion 424 and the second protrusion 425 in the circumferential direction.

The body 421, the first guide 422, the second guide 423, the first protrusion 424, and the second protrusion 425 of the insulator 420 may be integrally formed.

The coil 430 may be wound around the body 421.

The body 421 may be disposed on the tooth 412 of the stator core 410 to insulate the stator core 410 from the coil 430.

The body 421 may be formed in a "⊏" shape, and a groove 421a may be formed in an outer surface of the body 421. Here, the groove 421a may be in the form of a concave groove. In addition, when the coil 430 is wound around the body 421, the groove 421a may guide an arrangement of the coil 430.

The first guide 422 may be disposed on the body 421. As shown in FIGS. 7 and 8, the first guide 422 may be formed to protrude from the inner side of the body 421 in the shaft direction. Here, the shaft direction may be a length direction of the shaft 500.

Accordingly, the first guide 422 supports the coil 430 wound around the body 421, thereby inhibiting the coil 430 from being separated toward the inner side of the body 421.

Referring to FIG. 9, the first guide 422 may be formed to be higher than the second guide 423 with respect to an upper surface 421b of the body 421.

The second guide 423 may be disposed at the outer side of the body 421. As shown in FIGS. 7 and 8, the second guide 423 may be formed to protrude from the outer side of the body 421 in the shaft direction and the circumferential direction. Thus, the second guide 423 may include a first guide portion 423a extending from the outer side of the body 421 in the shaft direction and a second guide portion 423b extending from the outer side of the body 421 in the circumferential direction.

In this case, the first guide portion 423a may be disposed to be caught to an upper portion of the yoke 411. Accordingly, the first guide portion 423a may be disposed to overlap one region of the yoke 411 in the shaft direction. In addition, the second guide portion 423b may be disposed on the inner circumferential surface of the yoke 411.

The second guide 423 supports the coil 430 wound around the body 421 to inhibit the coil 430 from being separated outward.

Meanwhile, a groove may be formed in the second guide 423 to arrange a terminal which is electrically connected to the coil 430.

The first protrusion 424 and the second protrusion 425 guide an arrangement of the insulating member 440. In addition, as shown in FIG. 7, the first protrusion 424 and the second protrusion 425 may be formed to extend to be long in a vertical direction (shaft direction).

The first protrusion 424 may be formed to protrude outward from a side surface 422a of the first guide 422. In this case, a protruding length L1 of the first protrusion 424 may be limited by the winding of the coil 430. Here, the protruding length L1 may be a length in the radial direction with respect to an outer surface of the first guide 422.

In addition, a size of the first protrusion 424 may be determined by a slot open formed between the teeth 412 in the circumferential direction.

As shown in FIG. 8, the first protrusion 424 may be formed in a bent shape in a plan view and may include a first curved surface 424a. In addition, an inner end portion of the insulating member 440 may be disposed to be in contact with the first curved surface 424a. In this case, the first curved surface 424a may be formed to be concave inward of the first protrusion 424 in a plan view.

In addition, the upper surface 424b of the first protrusion 424 may be disposed coplanar with the upper surface 421b of the body 421.

The second protrusion 425 may be formed to protrude inward from an inner surface 423c of the second guide 423.

As shown in FIG. 8, the second protrusion 425 may be formed in a bent shape in a plan view and may include a second curved surface 425a. In addition, an outer end portion of the insulating member 440 may be disposed to be in contact with the second curved surface 425a. In this case, the second curved surface 425a may be formed to be concave inward of the second protrusion 425 in a plan view.

In addition, the upper surface 425b of the second protrusion 425 may be disposed coplanar with the upper surface 421b of the body 421.

Referring to FIGS. 2 and 3, the insulating member 440 is disposed on the unit stator 400a to insulate a coil 430 wound around one unit stator 400a from a coil 430 wound around a unit stator 400a disposed adjacent to the one unit stator 400a.

The insulating member 440 may be formed in a rectangular parallelepiped shape. Here, an insulating paper may be provided as the insulating member 440. Thus, since the insulating paper is flexible and light in weight, the insulating paper does not significantly affect performance of the motor 1.

Alternatively, the insulating member 440 may be formed of a synthetic resin material such as thin plate-shaped plastic.

As shown in FIG. 2, the insulating member 440 may be formed in a plate shape. In this case, a radial direction width W of the insulating member 440 is greater than a distance D1 between the first guide 422 and the second guide 423. Here, the radial direction width W of the insulating member 440 may be referred to as a radial direction length of the insulating member 440.

Accordingly, when the insulating member 440 is disposed, the insulating member 440 may be bent and disposed between the first guide 422 and the second guide 423.

In this case, the inner end portion of the insulating member 440 is supported on the first protrusion 424, and the outer end portion thereof is supported on the second protrusion 425. Owing to an elastic force formed in the insulating member 440 due to the bent shape of the insulating member 440, separation of the insulating member 440 is inhibited.

Here, the first curved surface 424a of the first protrusion 424 and the second curved surface 425a of the second protrusion 425 guide a bending direction of the insulating member 440 so that the plate-shaped insulating member 440 is curved. In addition, since each of the first curved surface 424a and the second curved surface 425a may be formed as a curved surface, a contact amount with the insulating member 440 may be increased. Accordingly, a supporting force due to the first curved surface 424a of the first protrusion 424 and the second curved surface 425a of the second protrusion 425 with respect to the insulating member 440 may be improved.

An example in which each of the first protrusion 424 and the second protrusion 425 is formed to have a predetermined curved surface has been described, but the present invention is not limited thereto. For example, inner surfaces of the first protrusion 424 and the second protrusion 425, which are in contact with the insulating member 440, may be formed to have a slope inclined at a predetermined angle. That is, the first protrusion 424 may include the inner surface which is a flat surface having a predetermined slope with respect to the first guide 422. In addition, the second protrusion 425 may include the inner surface which is a flat surface having a predetermined slope at a contact point with the inner surface 423c of the second guide 423.

Meanwhile, the insulating member 440 is disposed to be curved due to the first protrusion 424 and the second protrusion 425 so that the insulating member 440 may include a curved surface. Then, the curved surface of the insulating member 440 may be formed to have a predetermined curvature.

That is, one surface of the first protrusion 424 in contact with the insulating member 440 includes the first curved surface 424a corresponding to the curvature of the insulating member 440, and one surface of the second protrusion 425 in contact with the insulating member 440 includes the second curved surface 425a corresponding to the curvature of the insulating member 440 so that the curved surface of the insulating member 440 may be formed to have a predetermined curvature.

In this case, a curvature of the first curved surface 424a may be greater than that of the second curved surface 425a, but the present invention is not limited thereto. For example, the curvature of the first curved surface 424a may be formed to be equal to that of the second curved surface 425a. Accordingly, the insulating member 440 may be formed in an arc shape in a plan view.

In addition, the insulating member 440 may include a region in which the curvature of the curved surface is decreased in a direction away from a center of the stator core 410 in the radial direction.

For example, since a curved shape of the insulating member 440 is determined due to the distance D1 between the first guide 422 and the second guide 423, when the distance D1 between the first guide 422 and the second guide 423 is decreased, the insulating member 440 may be disposed between the first guide 422 and the second guide 423 in a shape in which a central side of the insulating member 440 protrudes further with respect to the circumferential direction. Accordingly, the insulating member 440 may include the region in which the curvature of the curved surface is decreased in the direction away from the center of the stator core 410 in the radial direction.

The first protrusion 424 may be disposed to face the second protrusion 425 in the radial direction. In this case, both the first protrusion 424 and the second protrusion 425 may be located in the clockwise direction with respect to the body 421.

Here, the second protrusion 425 may be disposed on an imaginary line L connecting a center C of the stator core 410 to one end of the first protrusion 424.

As shown in FIG. 3, an edge E2 at which the second curved surface 425a and the second guide 423 meet may be disposed on the imaginary line L, in a plan view, connecting the center C of the stator core 410 to an edge E1 at which the first curved surface 424a and the first guide 422 meet.

For example, a first edge E1 may be formed in a region in which the first curved surface 424a and the first guide 422 meet, and a second edge E2 may be formed in a region in which the second curved surface 425a and the second guide 423 meet. In this case, the second edge E2 may be disposed on the imaginary line L connecting the center C of the stator core 410 to the first edge E1 in a plan view. That is, the first edge E1 and the second edge E2 may be disposed on the imaginary line L disposed in the radial direction.

Referring to FIGS. 3 and 4, as the radial direction width W of the insulating member 440 is increased, the protruding length L1 of the first protrusion 424 may be decreased in the radial direction. For example, as the radial direction width W of the insulating member 440 is increased, since an elastic force of the insulating member 440 is increased and a contact force with the first protrusion 424 is increased, the protruding length L1 of the first protrusion 424 may be reduced.

In addition, as shown in FIG. 3, the insulating member 440 may be disposed farther outward than a coil 430 wound around an outermost side of the body 421 with respect to the circumferential direction.

For example, since the insulating member 440 is disposed between one region of the coil 430, which is wound around an outer side of the body 421 as a last turn, and the protrusions 424 and 425, the insulating member 440 insulates between the coils 430 with respect to the circumferential direction. Consequently, the insulating member 440 may be disposed farther outward than the coil 430 wound around the body 421 with respect to the circumferential direction.

In addition, a gap G between one region of the coil 430 wound around the outer side of the body 421 as the last turn and an end portion of the second protrusion 425 may be 0.95 to 1.0 times a diameter of the coil 430. Here, since the coil 430 is wound along the outer surface of the body 421 disposed on the tooth 412, the turn may mean the number of windings wound around the tooth 412 once.

In this case, an end portion C1 of the coil 430 may be disposed to face the second curved surface 425a of the second protrusion 425. Here, the end portion C1 of the coil 430 shown in FIG. 5 is a region corresponding to an end of the winding so that the end portion C1 thereof may be referred to as an end line.

When the coil 430 is wound, the diameter of the coil 430 is reduced due to tension applied from a winding device (not shown) to the coil 430. For example, when the coil 430 having a diameter of 1.9 mm is wound with tension of 20 Kg, the diameter of the coil 430 is reduced to 1.8 mm due to the tension. Thus, even when the gap G is smaller than the diameter of the coil 430, the end portion C1 of the coil 430 may be moved to the body 421 through the gap G.

In addition, when the tension is released, the reduced diameter of the coil 430 is restored. Consequently, the end portion C1 of the coil 430 is not separated through the gap G.

Further, since the insulating member 440 is disposed between the end portion C1 of the coil 430 and the second protrusion 425, the separation of the end portion C1 of the coil 430 may be further inhibited.

However, when the gap G is less than 0.95 times the diameter of the coil 430, the arrangement of the end portion C1 of the coil 430 may be hindered, and, when the gap G exceeds 1.0 times the diameter of the coil 430, the gap G affects a space factor of the coil 430. Here, the space factor may mean an amount of the coil 430 wound around the tooth 412.

Therefore, since a size of the gap G is adjusted to 0.95 to 1.0 times the diameter of the coil 430, it is possible to satisfy both the space factor of the coil 430 and the separation prevention of the end portion C1 of the coil 430. In this case, the amount of protrusion of the second protrusion 425 may also be adjusted due to the gap G.

Referring to FIGS. 7 and 9, the upper surface 421*b* of the body 421, the upper surface 424*b* of the first protrusion 424, and the upper surface 425*b* of the second protrusion 425 may be disposed on an imaginary coplanar surface. In addition, as shown in FIG. 5, an upper portion of the insulating member 440 may be disposed below the upper surface 424*b* of the first protrusion 424, but the present invention is not limited thereto. For example, the upper portion of the insulating member 440 may be disposed below the upper surface 424*b* of the first protrusion 424. Thus, the insulating member 440 may further secure insulation between the coils 430.

Figure 10:
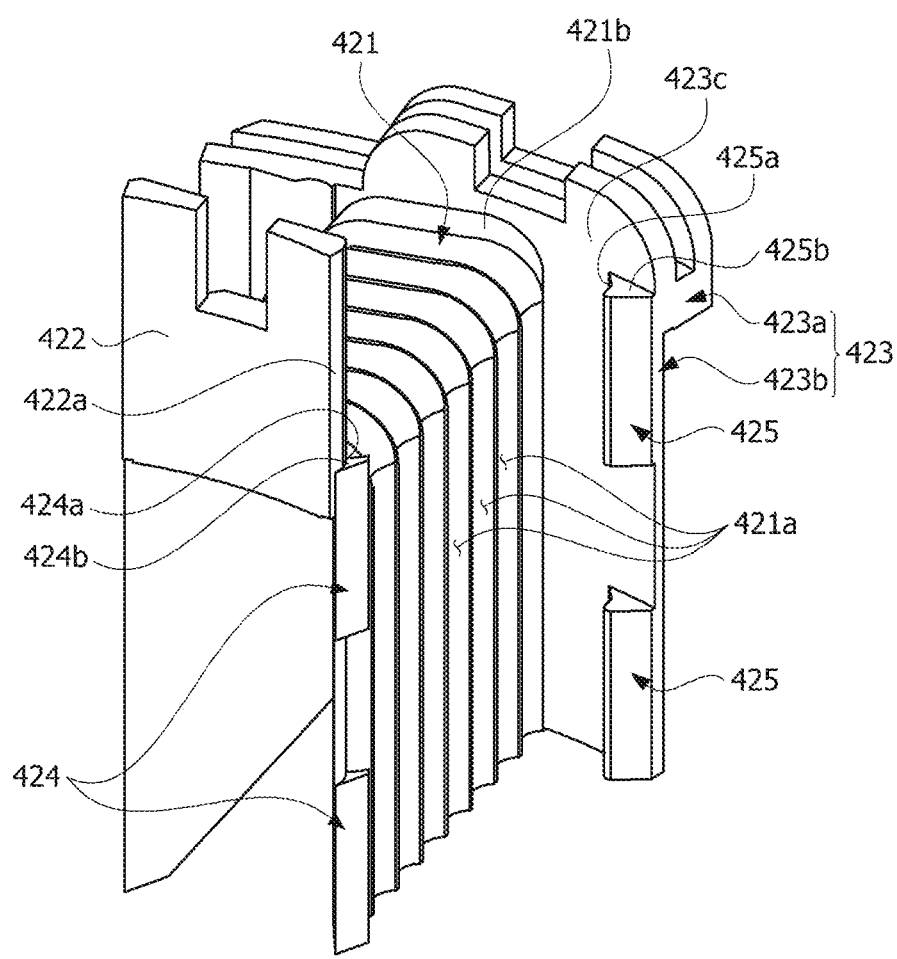
FIG. 10 is a perspective view illustrating another example of the insulator of the stator disposed in the motor according to the first embodiment.

FIG. 10 is a perspective view illustrating another example of the insulator of the stator disposed in the motor according to the first embodiment.

Referring to FIG. 10, when the insulator 420 shown in FIG. 7 is compared with an insulator 420*a* according to another example, the insulator 420*a* according to another example has a difference in the number of the first protrusions 424 and the number of the second protrusions 425. Here, the insulator 420*a* according to another example may be referred to as an insulator or a second insulator according to a second example and may be disposed on the stator 400 in place of the above-described insulator 420.

Referring to FIG. 10, the insulator 420*a* according to another example may include the body 421 around which the coil 430 is wound, a first guide 422 extending from the inner side of the body 421 to protrude in the shaft direction, a second guide 423 extending from an outer side of the body 421 to protrude in the shaft direction, a plurality of first protrusions 424 protruding outward from the first guide 422, and a plurality of second protrusions 425 protruding inward from the second guide 423. Here, the first protrusions 424 may be disposed to face the second protrusions 425. Accordingly, the insulating member 440, which is disposed between the first guide 422 and the second guide 423, may be disposed to be curved due to the first protrusions 424 and the second protrusions 425 in the circumferential direction.

As shown in FIG. 10, the plurality of first protrusions 424 may be disposed at an upper side and a lower side of the first guide 422 to be spaced apart from each other in the shaft direction.

In addition, the plurality of second protrusions 425 may be disposed at an upper side and a lower side of the second guide 423 to be spaced apart from each other in the shaft direction.

As shown in FIG. 1, the shaft 500 may be rotatably supported on the housing 100 due to the bearings 10. In addition, the shaft 500 may rotate by being linked with the rotation of the rotor 300.

The bus bar 600 may be disposed above the stator 400. In addition, the bus bar 600 may be electrically connected to the coil 430 of the stator 400.

The bus bar 600 may include a bus bar body and a plurality of terminals disposed in the bus bar body. Here, the bus bar body may be a molded product formed through injection molding. In addition, each of the terminals may be electrically connected to the coil 430 of the stator 400.

The sensor part 700 may detect a magnetic force of a sensing magnet installed to be rotatably linked with the rotor 300 to determine a current position of the rotor 300, thereby detecting rotation of the shaft 500.

The sensing part 700 may include a sensing magnet assembly 710 and a printed circuit board (PCB) 720.

The sensing magnet assembly 710 is coupled to the shaft 500 and linked with the rotor 300 to detect a position of the rotor 300. In this case, the sensing magnet assembly 710 may include a sensing magnet and a sensing plate. The sensing magnet may be coaxially coupled to the sensing plate.

The sensing magnet may include a main magnet disposed adjacent to a hole forming an inner circumferential surface in the circumferential direction and a sub-magnet formed at an edge of the main magnet. The main magnet may be arranged equal to a drive magnet inserted into the rotor 300 of the motor. The sub-magnet is more segmented than the main magnet and formed as many poles. Thus, a rotation angle may be further divided and measured, and driving of the motor may be made smoother.

The sensing plate may be formed of a metal material in the form of a disc. The sensing magnet may be coupled to an upper surface of the sensing plate. Further, the sensing plate may be coupled to the shaft 500. Here, a hole through which the shaft 500 passes is formed in the sensing plate.

A sensor for detecting a magnetic force of the sensing magnet may be disposed on the PCB 720. In this case, the sensor may be provided as a Hall integrated circuit (IC). In addition, the sensor may generate a sensing signal by detecting a variation in an N pole and an S pole of the sensing magnet.

Second Embodiment

Figure 11:
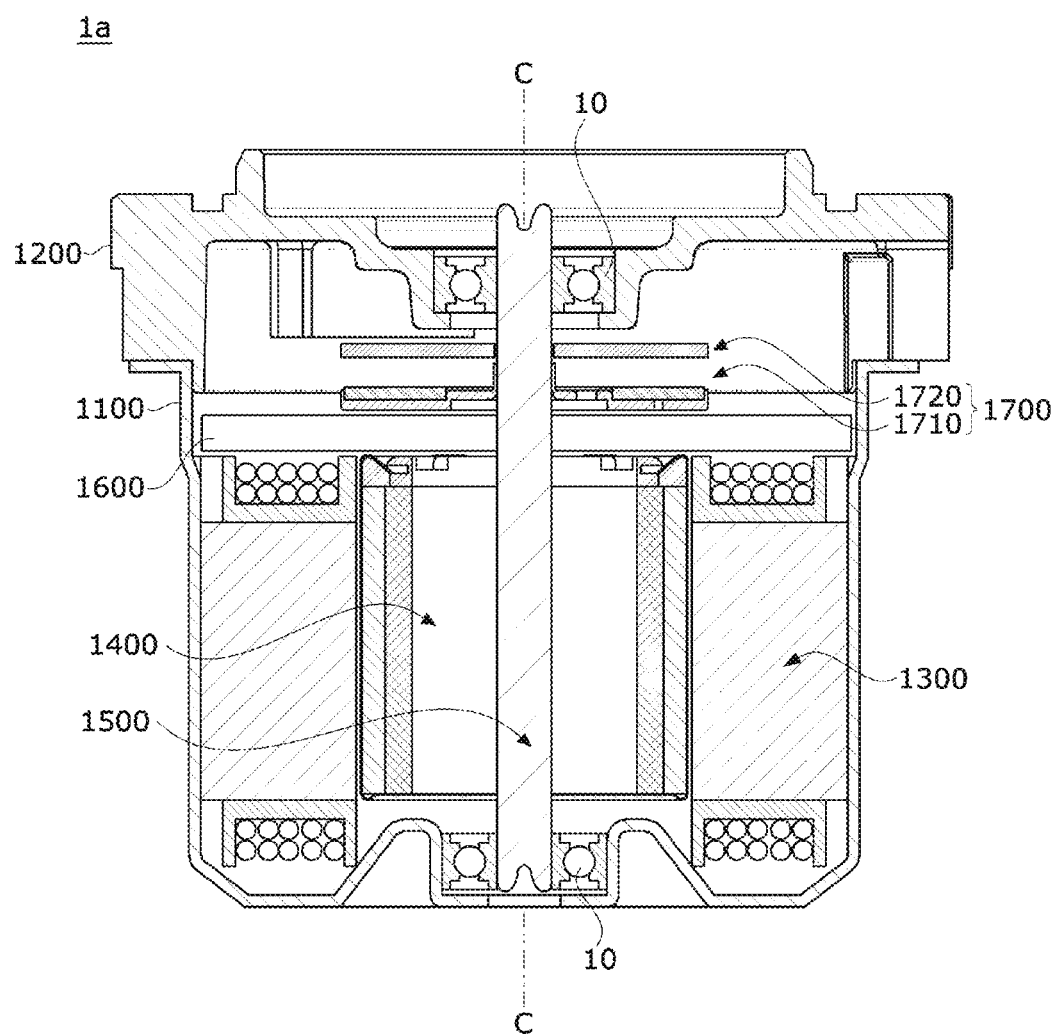
FIG. 11 is a diagram illustrating a motor according to a second embodiment.

FIG. 11 is a diagram illustrating a motor according to a second embodiment.

Referring to FIG. 11, a motor 1*a* according to the second embodiment may include a housing 1100 with an opening formed at one side thereof, a cover 1200 disposed in an upper portion of the housing 1100, a stator 1300 disposed in the housing 1100, a rotor 1400 disposed in the stator 1300, a shaft 1500 rotated together with the rotor 1400, a bus bar 1600 disposed above the stator 1300, and a sensing part 1700 for detecting rotation of the shaft 1500.

When the motor 1*a* according to the second embodiment is compared with the motor 1 according to the first embodiment, there is a difference in the stator.

The housing 1100 and the cover 1200 may form an outer shape of the motor 1*a*. In addition, an accommodation space may be formed due to a coupling between the housing 1100 and the cover 1200. Thus, as shown in FIG. 11, the stator 1300, the rotor 1400, the shaft 1500 may be disposed in the accommodation space. In this case, the shaft 1500 is rotatably disposed in the accommodation space. Thus, the motor 1*a* may further include a bearing 10 disposed on each of an upper portion and a lower portion of the shaft 1500.

The housing 1100 may be formed in a cylindrical shape. In addition, the stator 1300, the rotor 1400, and the like may be accommodated in the housing 1100.

The cover 1200 may be disposed on an opening surface of the housing 1100, that is, on the upper portion of the housing 1100, so as to cover an opening of the housing 1100.

The stator 1300 may be disposed in the housing 1100. In this case, the stator 1300 may be supported on an inner circumferential surface of the housing 1100. Further, the stator 1300 is disposed on an outer side of the rotor 1400. That is, the rotor 1400 may be rotatably disposed at an inner side of the stator 1300.

Figure 12:
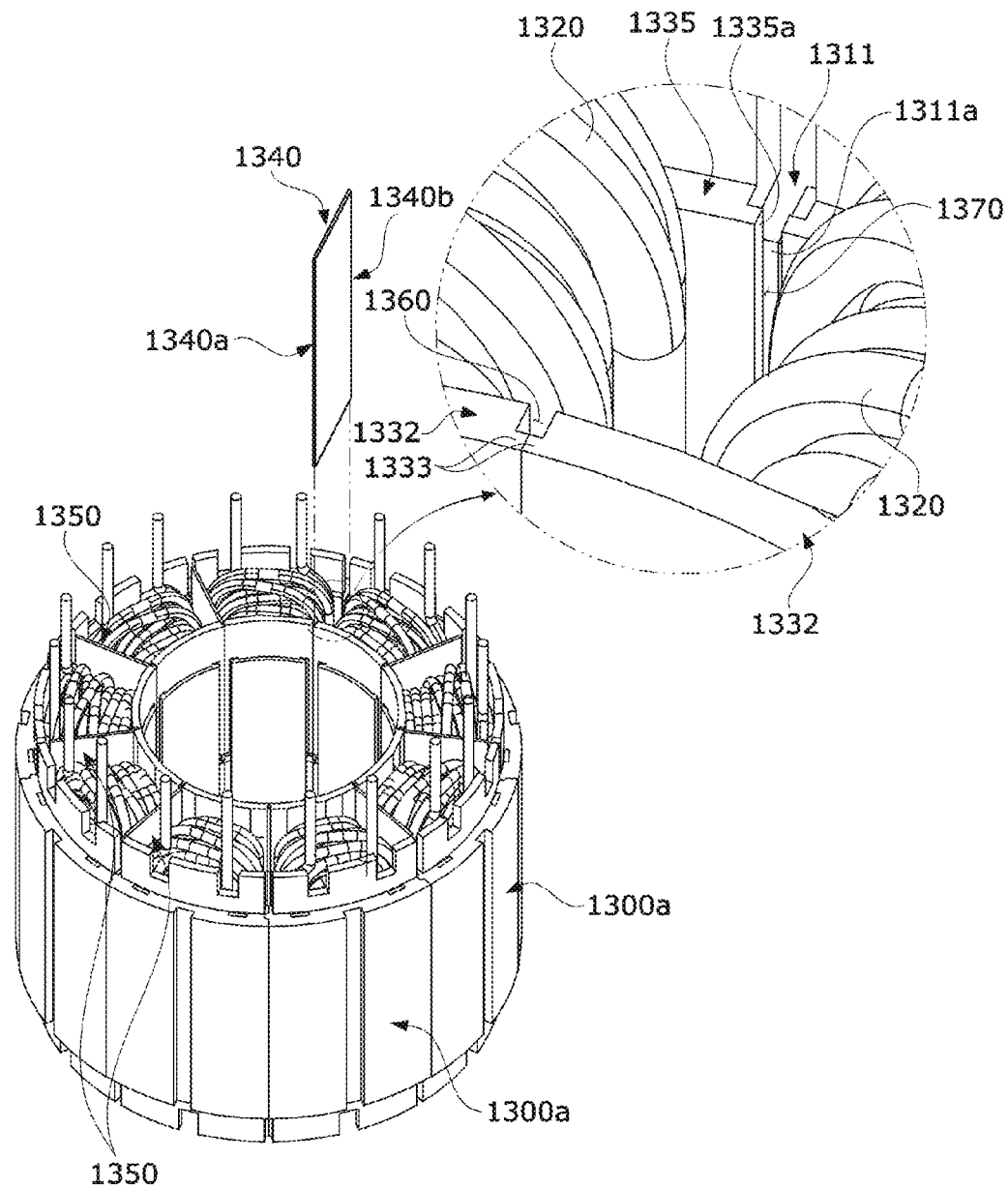
FIG. 12 is a diagram illustrating an example of a stator disposed in the motor according to the second embodiment.
Figure 13:
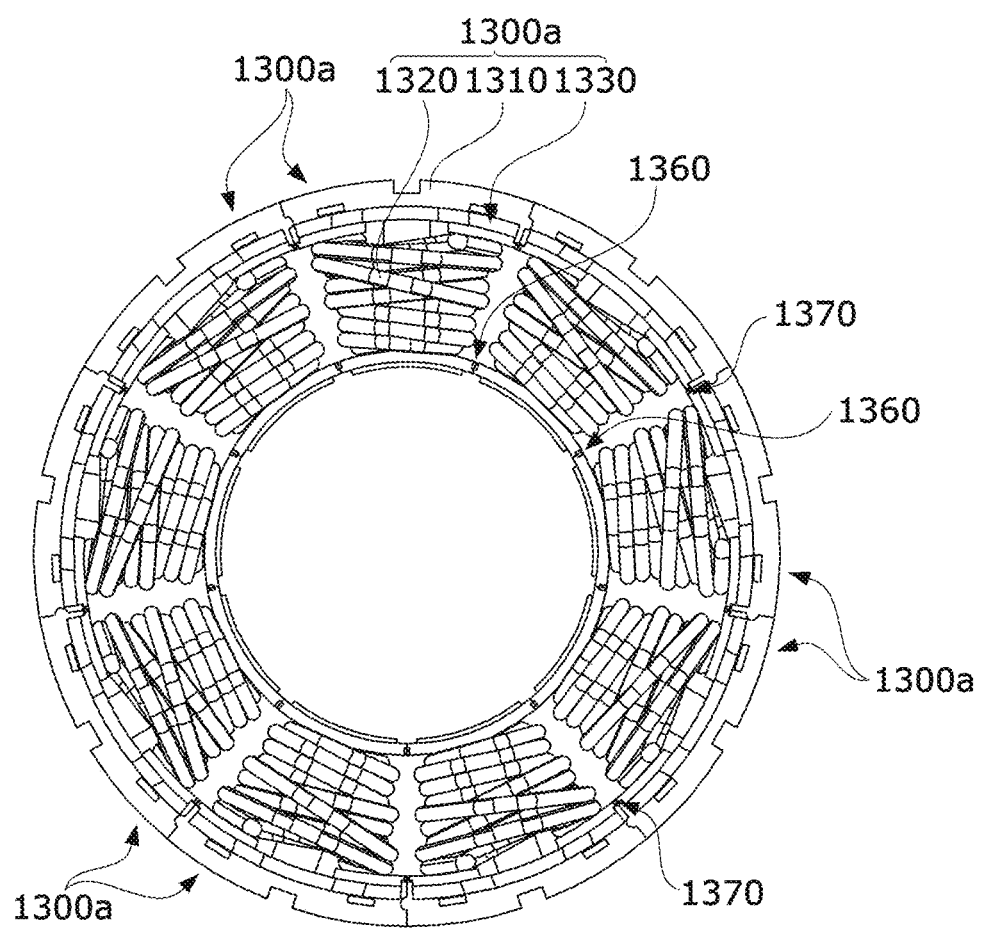
FIG. 13 is a diagram illustrating a plurality of stator units disposed in the stator of the motor according to the second embodiment.
Figure 14:
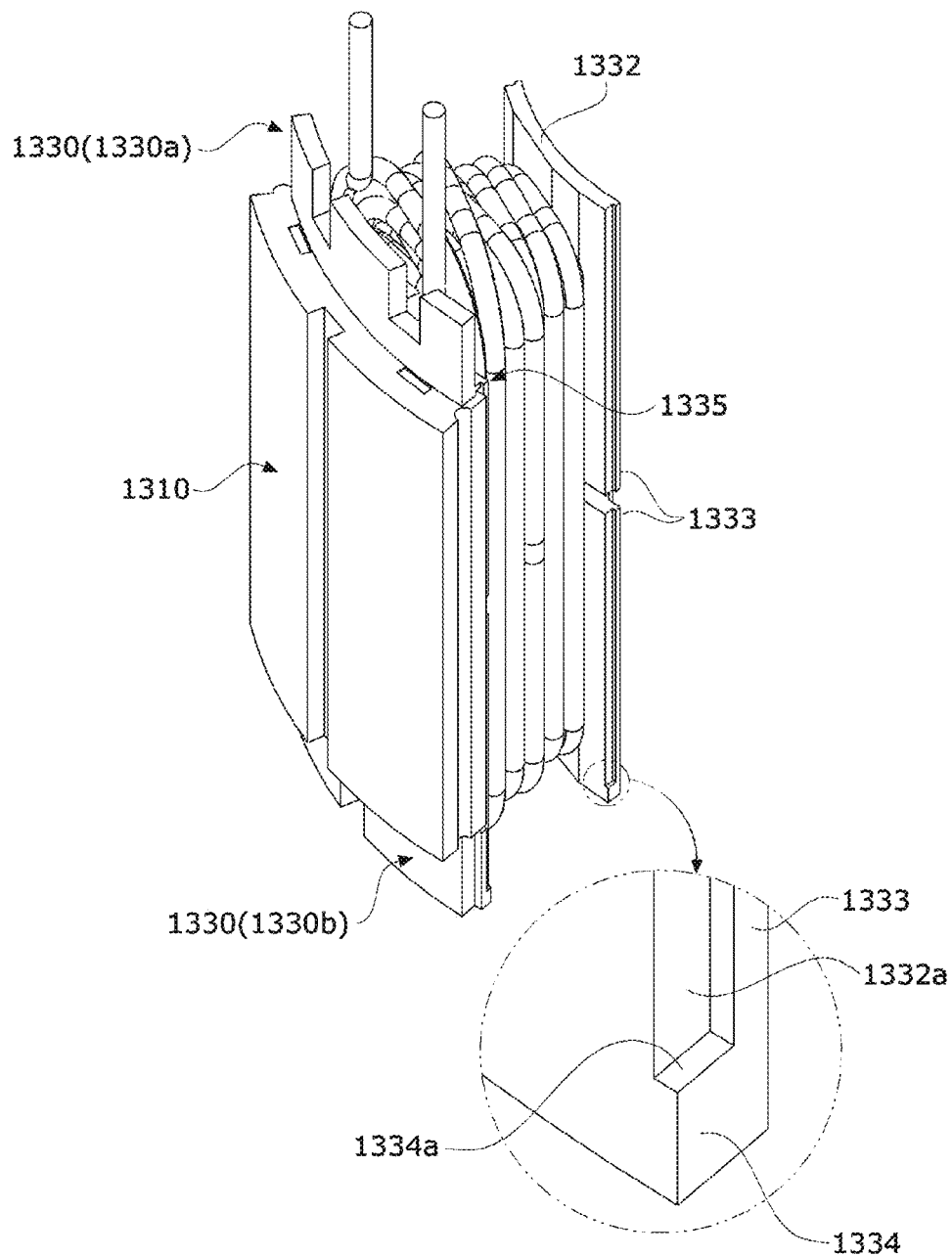
FIGS. 14 and 15 are diagrams illustrating a stator unit of the stator disposed in the motor according to the second embodiment.
Figure 15:
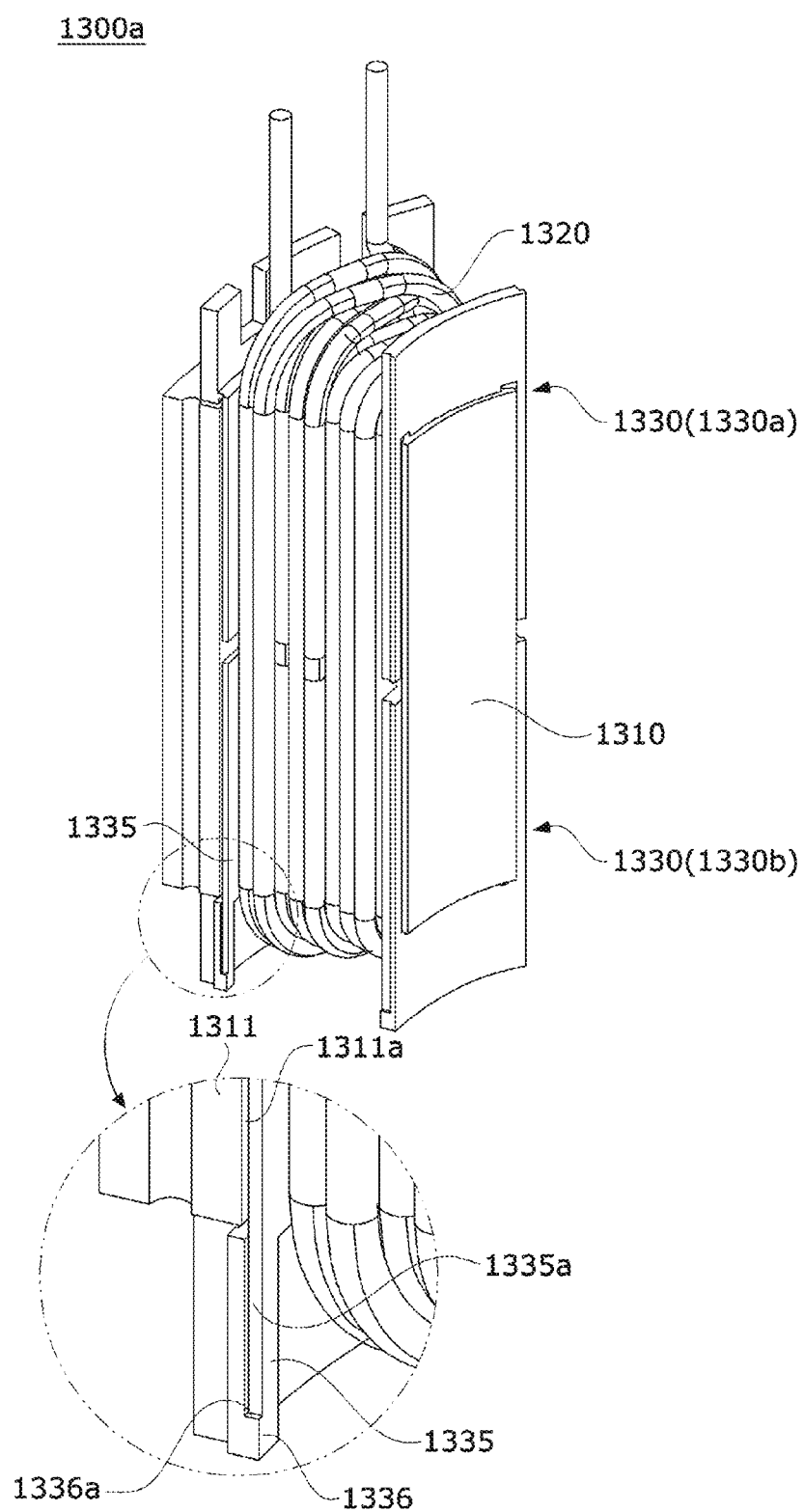

FIG. 12 is a diagram illustrating an example of a stator disposed in the motor according to the second embodiment, FIG. 13 is a diagram illustrating a plurality of stator units disposed in the stator of the motor according to the second embodiment, and FIGS. 14 and 15 are diagrams illustrating a stator unit of the stator disposed in the motor according to the second embodiment. Here, FIG. 12 is a diagram illustrating the stator according to the first embodiment. When the stator is compared with the stator according to the second embodiment, there is a difference in a shape of an insulating member.

Referring to FIGS. 12 to 15, the stator 1300 may include a plurality of stator units 1300a disposed in the circumferential direction, an insulating member 1340 for insulating the stator units 1300a from each other, and a first guide portion 1360 for guiding an arrangement of the insulating member 1340. In addition, the stator 1300 may further include a second guide portion 1370 for guiding the arrangement of the insulating member 1340. Here, the insulating member 1340 is disposed between the stator units 1300a to insulate a coil 1320 of the stator unit 1300a.

For example, the stator 1300 may be implemented by arranging a plurality of stator units 1300a in the circumferential direction and arranging the insulating member 1340 between the coils 1320 of each stator unit 1300a. In this case, the insulating member 1340 may be guided by the first guide portion 1360 and the second guide portion 1370 which are formed by arranging the stator unit 1300a in the circumferential direction.

Figure 16:
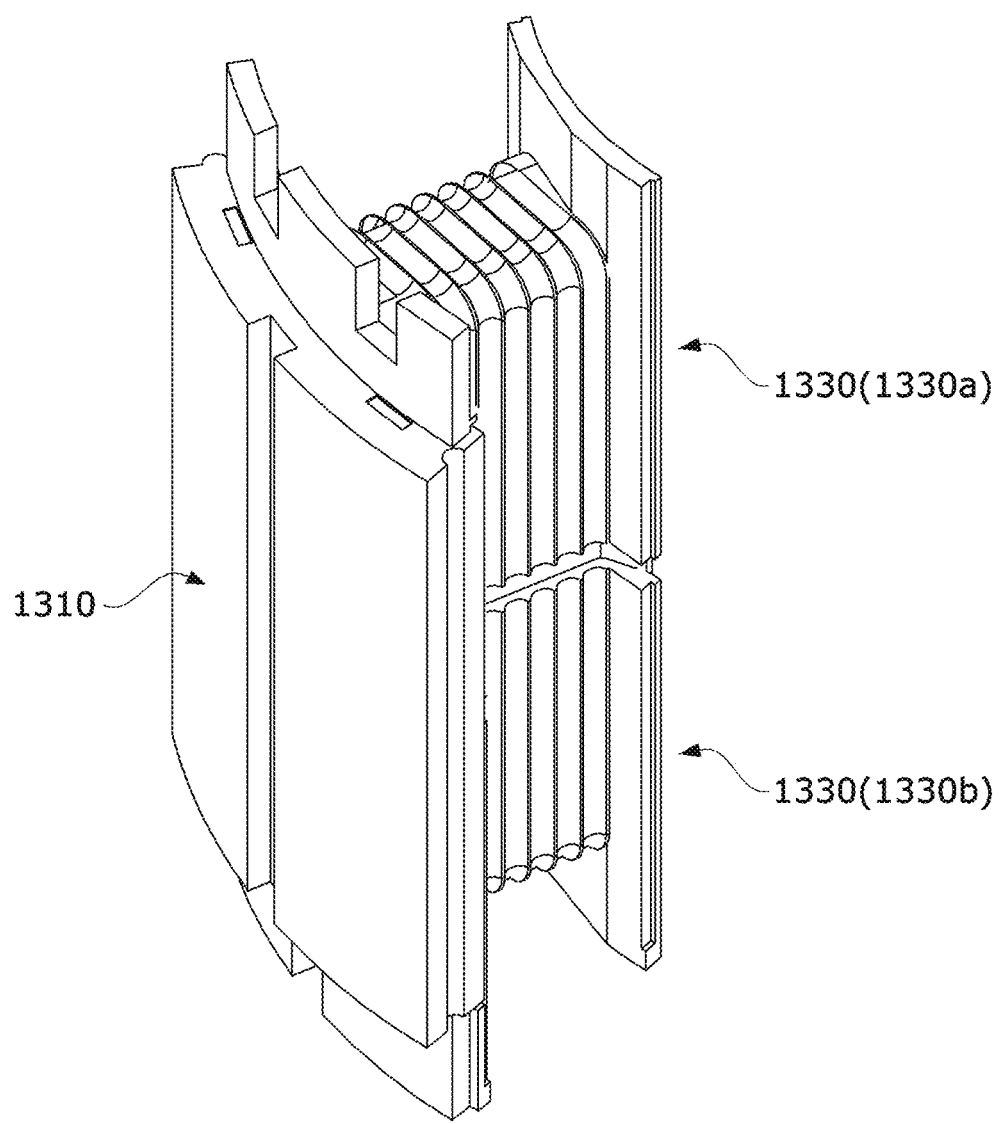
FIG. 16 is a perspective view illustrating a stator core and an insulator of the stator unit disposed in the stator of the motor according to the second embodiment.
Figure 17:
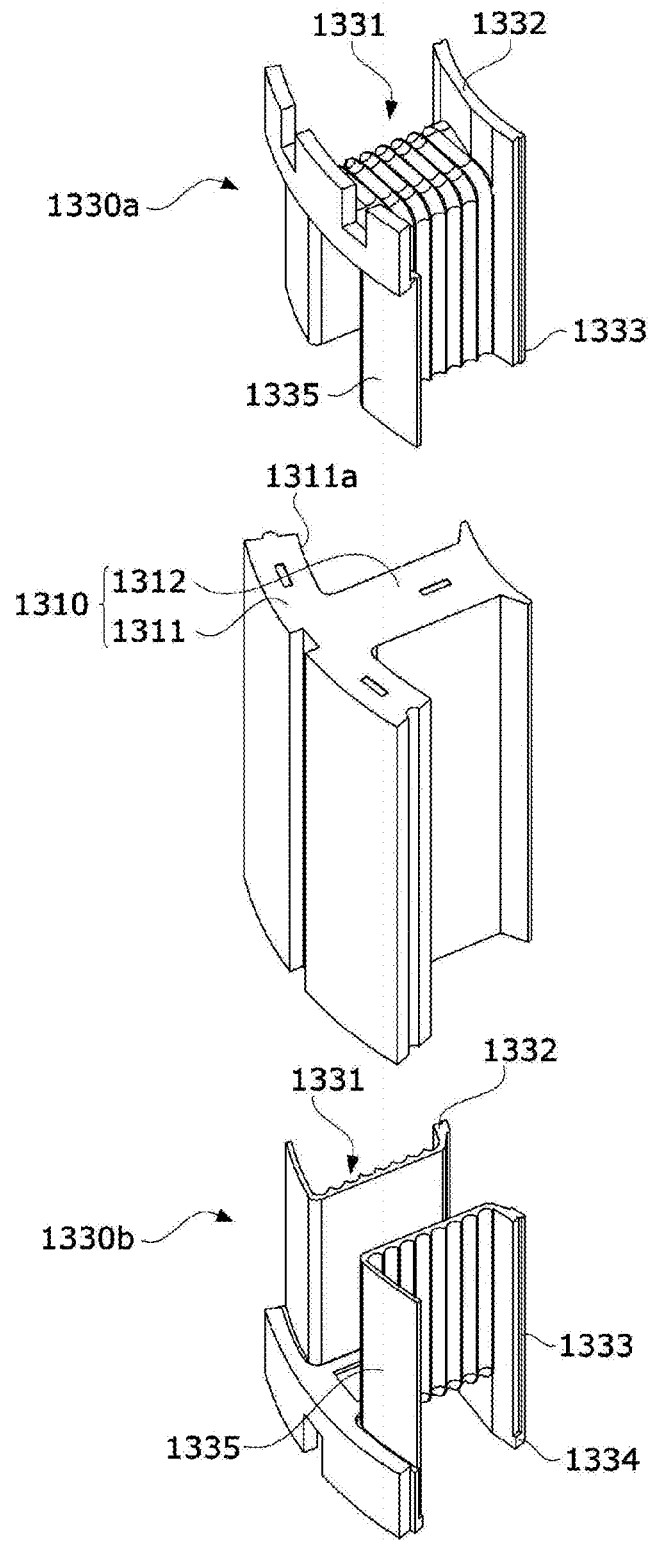
FIG. 17 is an exploded perspective view illustrating the stator core and the insulator of the stator unit disposed in the stator of the motor according to the second embodiment.

FIG. 16 is a perspective view illustrating a stator core and an insulator of the stator unit disposed in the stator of the motor according to the second embodiment, and FIG. 17 is an exploded perspective view illustrating the stator core and the insulator of the stator unit disposed in the stator of the motor according to the second embodiment.

Referring to FIGS. 14 to 17, the stator unit 1300a may include a stator core 1310, the coil 1320 wound around the stator core 1310, and an insulator 1330 disposed between the stator core 1310 and the coil 1320.

The coil 1320 forming a rotating magnetic field may be wound around the stator core 1310.

The stator core 1310 may be formed by stacking a plurality of plates in the form of a thin steel sheet, but the present invention is not necessarily limited thereto. For example, the stator core 1310 may be formed of a single product.

Referring to FIG. 17, the stator core 1310 may include an arc-shaped yoke 1311 and a tooth 1312. In addition, in order for winding of the coil 1320, the tooth 1312 may be formed to protrude from an inner circumferential surface 1311a of the yoke 1311 in the radial direction. Here, an example in which the yoke 1311 and the tooth 1312 are integrally formed has been described, but the present invention is not limited thereto.

Meanwhile, the tooth 1312 may be disposed to face a magnet of the rotor 1400. In addition, the coil 1320 is wound around the tooth 1312.

The insulator 1330 insulates the stator core 1310 from the coil 1320. Thus, the insulator 1330 may be disposed between the stator core 1310 and the coil 1320.

Accordingly, the coil 1320 may be wound around the stator core 1310 on which the insulator 1330 is disposed. Accordingly, the coil 1320 may form a rotating magnetic field due to a supply of power.

As shown in FIGS. 14 and 15, the insulator 1330 may be disposed on the tooth 1312 of the stator core 1310 to insulate the stator core 1310 from the coil 1320. Here, the insulator 1330 may be formed of a resin material.

The insulator 1330 may include a main body 1331 around which the coil 1320 is wound, an inner guide 1332 extending to protrude from an inner side of the main body 1331 in a length direction of the shaft 1500, a first protrusion 1333 protruding circumferentially from one region of a side surface of the inner guide 1332, and an outer guide 1335 extending to protrude from an outer side of the main body 1331. Here, the main body 1331, the inner guide 1332, the first protrusion 1333, and the outer guide 1335 may be integrally formed.

The coil 1320 may be wound around the main body 1331.

The main body 1331 may be disposed on the tooth 1312 of the stator core 1310 to insulate the stator core 1310 from the coil 1320.

The main body 1331 may be formed in a "⊏" shape, and a groove 1331a may be formed in an outer surface of the main body 1331 in the shaft direction. Here, the groove 1331a may be in the form of a concave groove. In addition, when the coil 1320 is wound, the groove 1331a may guide an arrangement of the coil 1320.

The inner guide 1332 supports the coil 1320 wound around the main body 1331 to inhibit the coil 1320 from being separated inward.

The inner guide 1332 may be disposed at the inner side of the main body 1331. In addition, the inner guide 1332 may be formed to protrude from the inner side of the main body 1331 in the shaft direction and the circumferential direction. Here, the shaft direction may be a length direction of the shaft 1500.

The first protrusion 1333 may protrude from one region of a side surface 1332a of the inner guide 1332 in the circumferential direction.

In this case, since the side surfaces 1333a of the first protrusions 1333 disposed adjacent to each other are in contact with each other, the first guide portion 1360 may be formed. For example, the first guide portion 1360 may be disposed between an inner guide 1332 of one stator unit 1300a and an inner guide 1332 of another stator unit 1300a adjacent thereto.

As shown in FIG. 12, the first guide portion 1360 may be provided as a groove 1360 which is formed to be concave. Here, an example in which the first guide portion 1360 is provided as a groove has been described, but the present invention is not necessarily limited thereto.

Accordingly, the groove 1360 guides an arrangement of the insulating member 1340. Thus, an inner end portion 1340a of the insulating member 1340 is disposed in the groove 1360.

Meanwhile, the insulator 1330 may include a second protrusion 1334 extending to protrude outward from a lower portion of the first protrusion 1333 formed in the inner guide 1332.

The second protrusion 1334 may serve as a hook bump. For example, when the insulating member 1340 is guided by the groove 1360, the insulating member 1340 is moved only to a predetermined position due to an upper surface 1334a of the second protrusion 1334. Accordingly, the upper surface 1334a of the second protrusion 1334 may be in contact with a lower surface of the insulating member 1340.

The outer guide 1335 supports the coil 1320 wound around the main body 1331 to inhibit the coil 1320 from being separated outward.

The outer guide 1335 may be disposed at the outer side of the main body 1331. In addition, the outer guide 1335 may be formed to protrude from the outer side of the main body 1331 in the shaft direction and the circumferential direction.

As shown in FIG. 12, since the side surfaces 1335a of the outer guides 1335 disposed adjacent to each other are spaced apart from each other, the second guide portion 1370 may be formed. For example, the second guide portion 1370 may be disposed between an outer guide 1335 of one stator unit 1300a and an outer guide 1335 of another stator unit 1300a adjacent thereto.

As shown in FIG. 12, the second guide portion 1370 may be provided as a slit 1370 which is a space. Here, an example in which the second guide portion 1370 is provided as a slit has been described, but the present invention is not necessarily limited thereto.

Accordingly, the slit 1370 guides the arrangement of the insulating member 1340. Thus, an outer end portion 1340b of the insulating member 1340 is disposed in the slit 1370.

Meanwhile, the insulator 1330 may include a third protrusion 1336 protruding from a lower portion of a side surface 1335a of the outer guide 1335 in the circumferential direction.

The third protrusion 1336 may serve as a hook bump. For example, when the insulating member 1340 is guided by the slit 1370, the insulating member 1340 is moved only to a predetermined position due to an upper surface 1336a of the third protrusion 1336. Accordingly, the upper surface 1336a of the third protrusion 1336 may be in contact with the lower surface of the insulating member 1340.

As shown in FIGS. 16 and 17, the insulator 1330 may be divided into an upper insulator 1330a disposed on the upper portion and the side surface of the tooth 1312, and a lower insulator 1330b disposed on the lower portion and the side surface of the tooth 1312.

Figure 18:
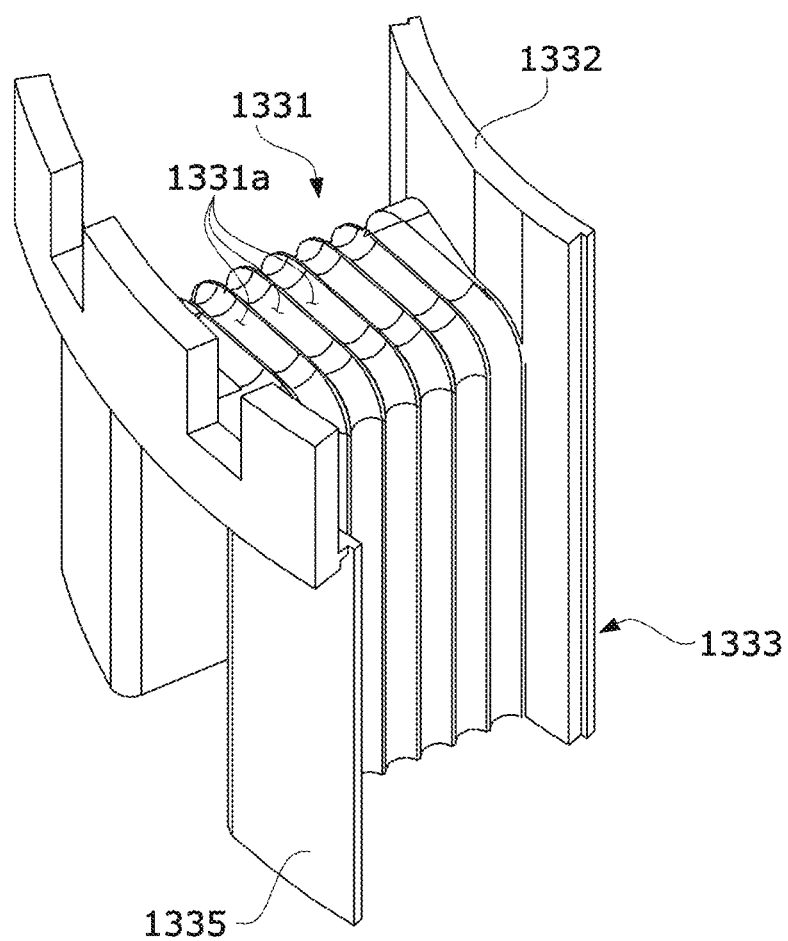
FIG. 18 is a perspective view illustrating an upper insulator of the motor according to the second embodiment.
Figure 19:
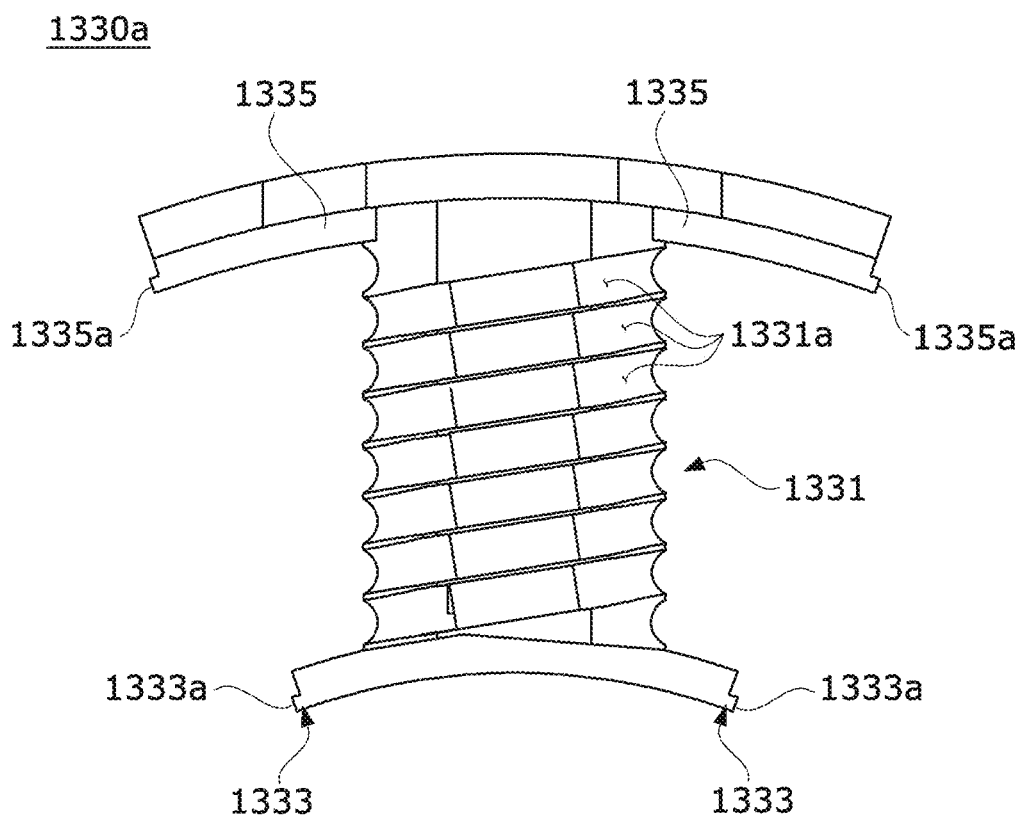
FIG. 19 is a plan view illustrating the upper insulator of the motor according to the second embodiment.

FIG. 18 is a perspective view illustrating an upper insulator of the motor according to the second embodiment, and FIG. 19 is a plan view illustrating the upper insulator of the motor according to the second embodiment.

Referring to FIGS. 17 to 19, the upper insulator 1330a may include the main body 1331, the inner guide 1332, the first protrusion 1333, and the outer guide 1335. In this case, the main body 1331 of the upper insulator 1330a is disposed on the upper portion and the side surface of the tooth 1312.

Figure 20:
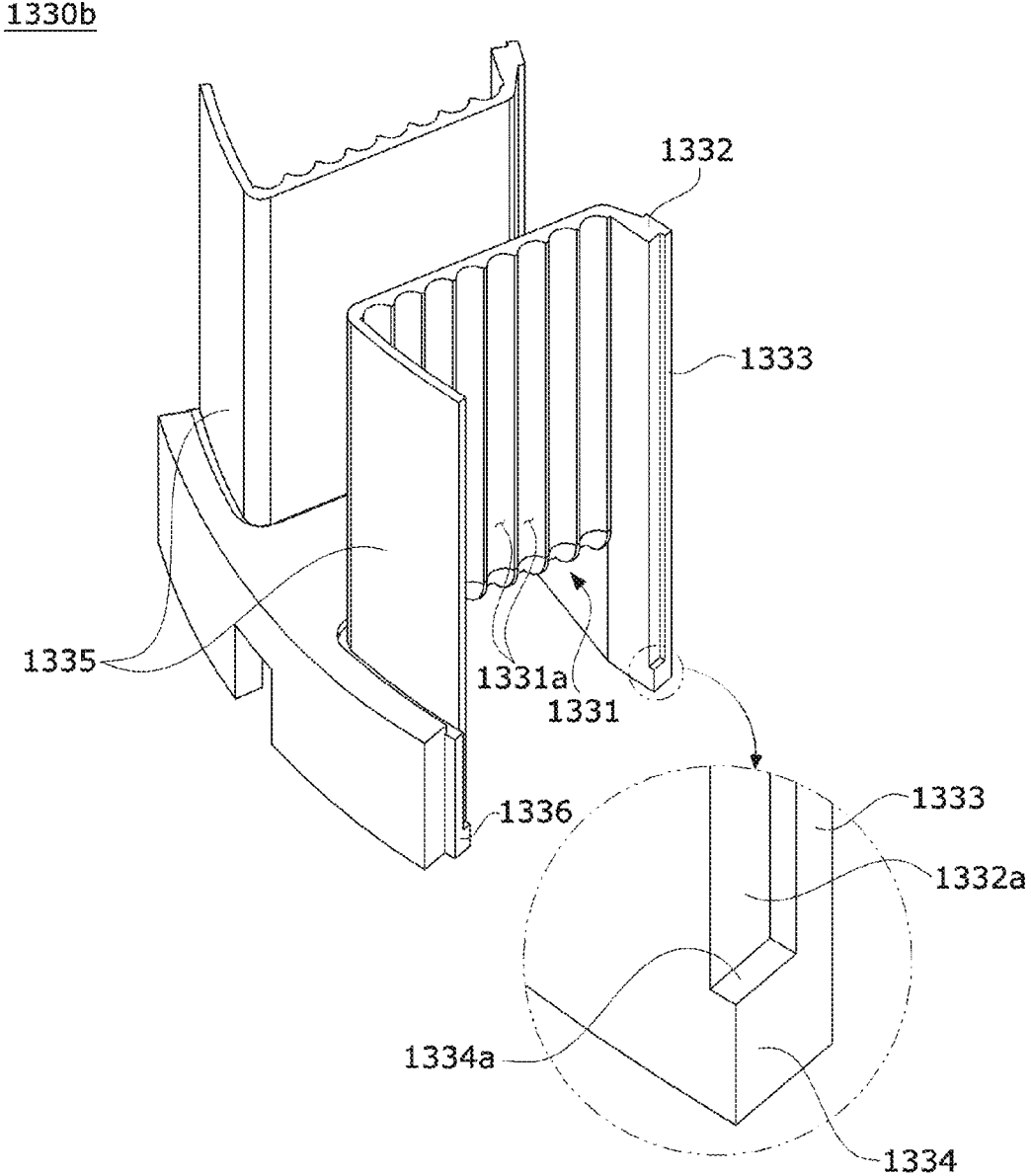
FIG. 20 is a perspective view illustrating a lower insulator of the motor according to the second embodiment.
Figure 21:
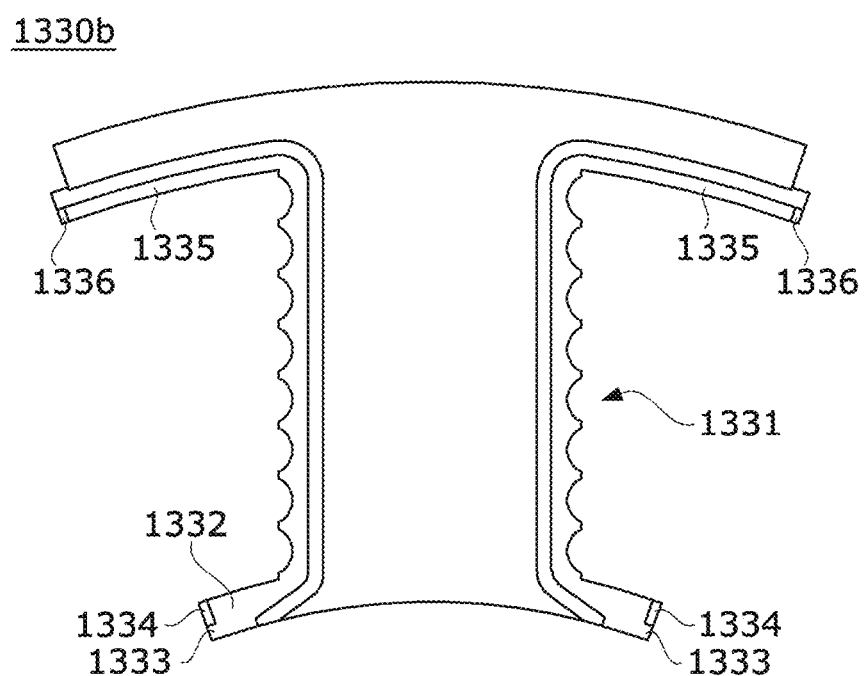
FIG. 21 is a plan view illustrating the lower insulator of the motor according to the second embodiment.
Figure 22:
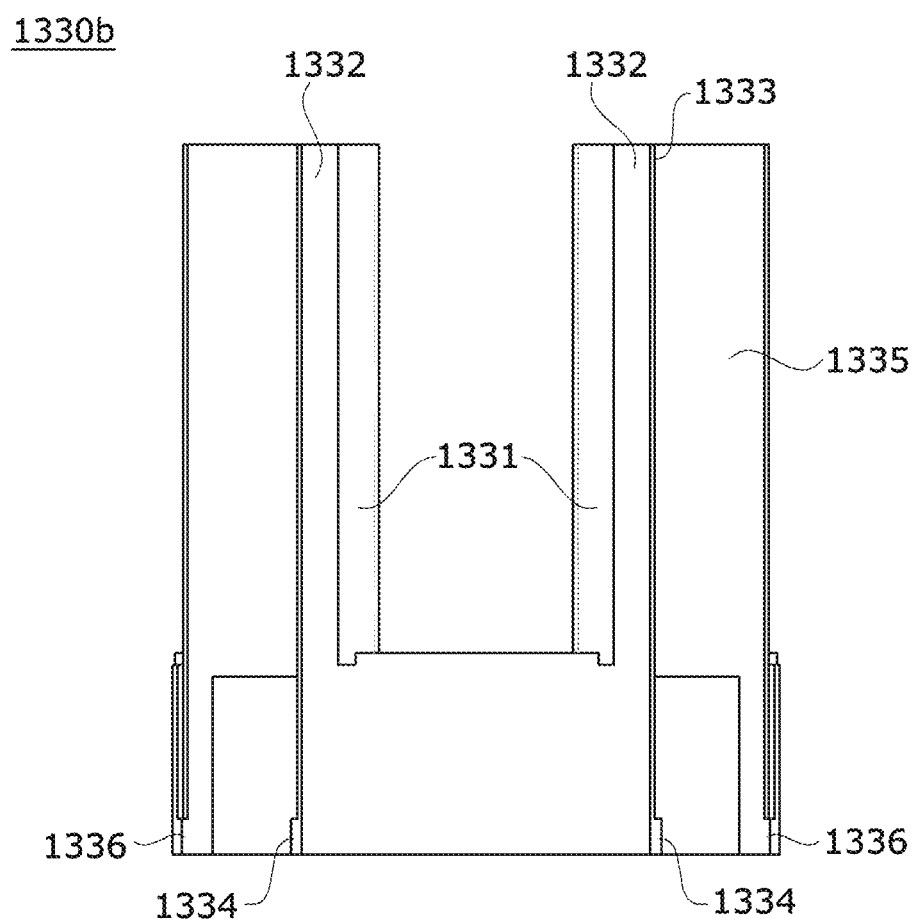
FIG. 22 is a front view illustrating the upper insulator of the motor according to the second embodiment.

FIG. 20 is a perspective view illustrating a lower insulator of the motor according to the second embodiment, FIG. 21 is a plan view illustrating the lower insulator of the motor according to the second embodiment, and FIG. 22 is a front view illustrating the upper insulator of the motor according to the second embodiment.

Referring to FIGS. 17 and 20 to 22, the lower insulator 1330b may include the main body 1331, the inner guide 1332, the first protrusion 1333, the second protrusion 1334, the outer guide 1335, and the third protrusion 1336. In this case, the main body 1331 of the lower insulator 1330b is disposed on the lower portion and the side surface of the tooth 1312.

The second protrusion 1334 of the lower insulator 1330b may be formed to extend outward from the lower portion of the first protrusion 1333.

The third protrusion 1336 of the lower insulator 1330b may be formed to extend from the lower portion of the side surface 1335a of the outer guide 1335 in the circumferential direction.

That is, the lower insulator 1330b is different from the upper insulator 1330a in that the lower insulator 1330b includes the second protrusion 1334 and the third protrusion 1336.

Figure 23:
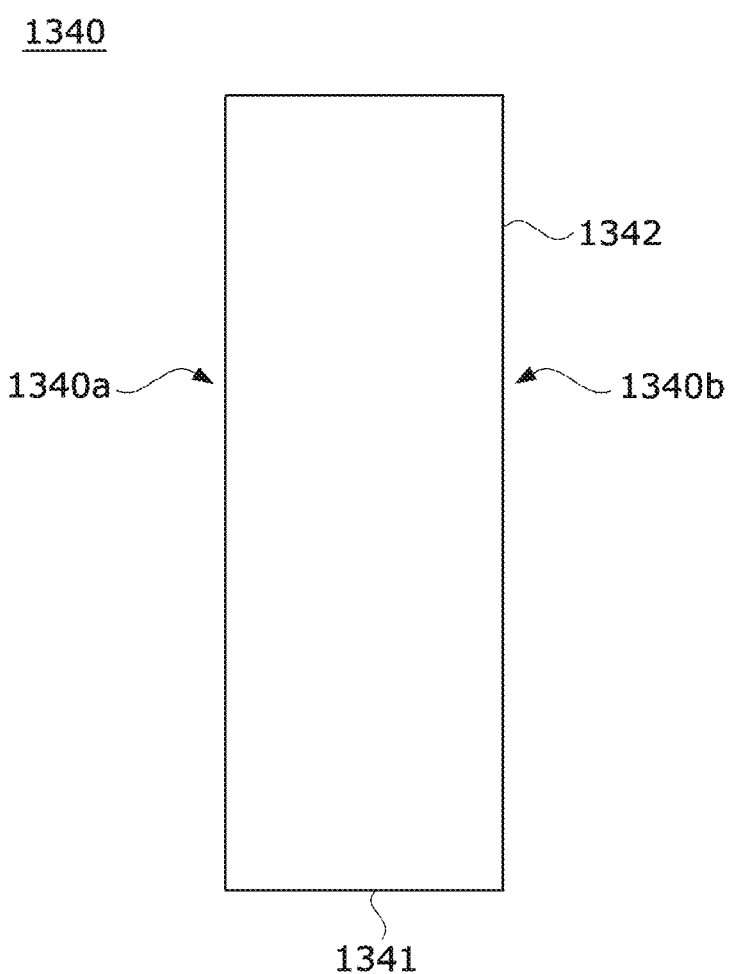
FIG. 23 is a side view illustrating an example of an insulating member.

FIG. 23 is a side view illustrating an example of the insulating member.

Referring to FIGS. 12 and 23, the insulating member 1340 is disposed between the stator units 1300a to insulate the coils 1320. Here, the insulating member 1340 may be referred to as a first insulating member.

As shown in FIG. 12, the insulating member 1340 may be formed in a rectangular parallelepiped shape. Here, the insulating member 1340 may be an insulating paper.

The inner end portion 1340a and the outer end portion 1340b of the insulating member 1340 are guided by the first guide portion 1360 and the second guide portion 1370 to be disposed between the stator units 1300a. In this case, the lower surface 1341 of the insulating member 1340 is in contact with the upper surface 1334a of the second protrusion 1334 and the upper surface 1336a of the third protrusion 1336 to direct the insulating member 1340 to be located at a predetermined position.

Further, an outer end surface 1342 of the insulating member 1340 may be in contact with the inner circumferential surface 1311a of the yoke 1311 of the stator core 1310.

Therefore, the movement and separation of the insulating member 1340 are inhibited due to the second protrusion 1334, the third protrusion 1336, the first guide portion 1360, and the second guide portion 1370.

Figure 24:
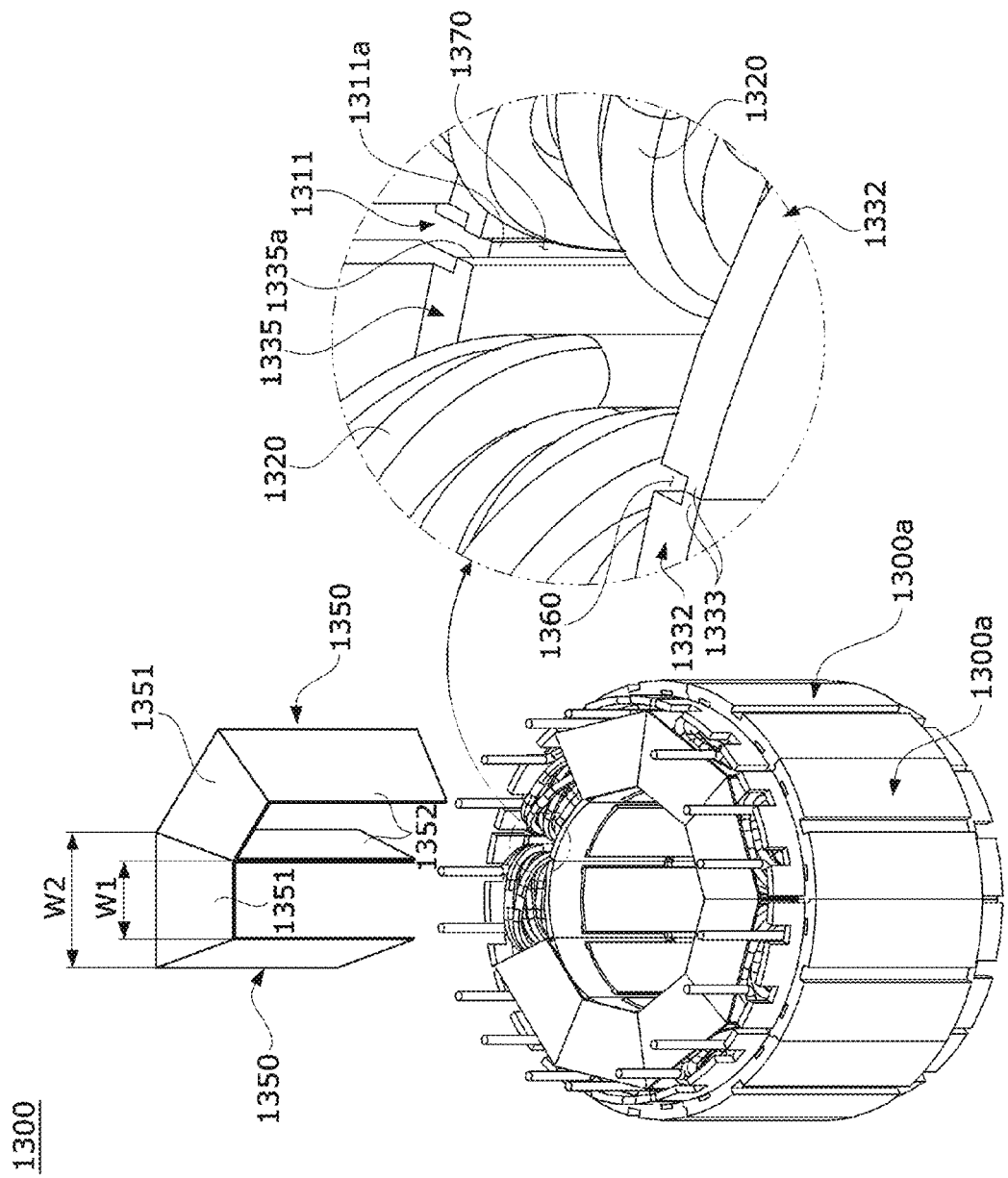
FIG. 24 is a diagram illustrating another example of the stator disposed in the motor according to the second embodiment.
Figure 25:
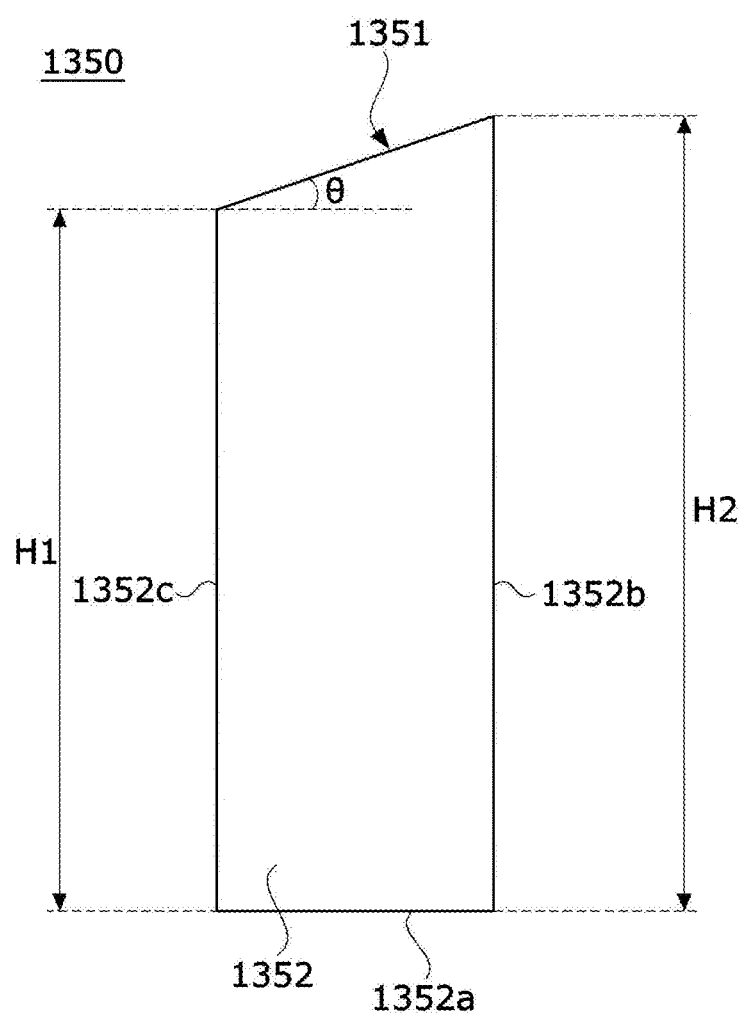
FIG. 25 is a side view illustrating another example of the insulating member.

FIG. 24 is a diagram illustrating another example of the stator disposed in the motor according to the second embodiment, and FIG. 25 is a side view illustrating another example of the insulating member. Here, FIG. 24 is a diagram illustrating the stator according to the second embodiment.

Referring to FIG. 24, the stator 1300 may include a plurality of stator units 1300a disposed in the circumferential direction, an insulating member 1350 for covering the coil of the stator unit 1300a, and the first guide portion 1360 for guiding an arrangement of the insulating member 1350. In addition, the stator 1300 may further include the second guide portion 1370 for guiding the arrangement of the insulating member 1350. Here, an insulating paper may be provided as the insulating member 1350. Thus, since the insulating paper is flexible and light in weight, the insulating paper does not significantly affect performance of the motor.

In order to distinguish the insulating member 1350 of the stator 1300 according to the second embodiment from the insulating member 1340 of the stator 1300 according to the first embodiment, the insulating member 1350 may be referred to as a second insulating member.

Referring to FIGS. 24 and 25, the insulating member 1350 may include a plate 1351 and side walls 1352 extending from both side ends of plate 1351 to protrude to one side. In this case, the plate 1351 may be disposed above the coil 1320. In addition, the side wall 1352 may be disposed between the coils 1320.

The side wall 1352 is guided by the first guide portion 1360 and the second guide portion 1370 to be disposed between the stator units 1300a.

A lower surface 1352a of the side wall 1352 is in contact with the upper surface 1334a of the second protrusion 1334 and the upper surface 1336a of the third protrusion 1336 to direct the insulating member 1340 to be located at a predetermined position.

In this case, an outer surface 1352b of the side wall 1352 may be in contact with the inner circumferential surface 1311a of the yoke 1311 of the stator core 1310.

Therefore, the movement and separation of the insulating member 1350 are inhibited due to the second protrusion 1334, the third protrusion 1336, the first guide portion 1360, and the second guide portion 1370.

Meanwhile, a height H1 of an inner surface 1352c of the side wall 1352 may be smaller than a height H2 of the outer surface 1352b. Accordingly, the plate 1351 may be disposed to be inclined at a predetermined angle θ with respect to the lower surface 1352a of the side wall 1352.

That is, since a space factor may be improved as the coil 1320 goes outward, the plate 1351 may be formed to have the predetermined angle θ.

Referring to FIG. 24, an inner width W1 of the plate 351 may be formed to be smaller than an outer width W2 thereof. For example, the plate 351 may be formed in a trapezoidal shape.

As shown in FIG. 24, an example in which the insulating member 1350 is consecutively disposed on the stator unit 1300a in the circumferential direction has been described, but the present invention is not necessarily limited thereto. For example, the insulating member 1350 may be disposed on one stator unit 1300a in the circumferential direction, may skip a stator unit 1300a disposed adjacent to the one stator unit 1300a, and then may be disposed on the next stator unit 1300a.

The rotor 1400 may be disposed at an inner side of the stator 1300. In addition, the shaft 1500 may be coupled to a central portion of the rotor 1400.

The rotor 1400 may be formed by coupling magnets (not shown) to a rotor core (not shown). For example, the rotor 1400 may be formed as a type in which the magnets are disposed on an outer peripheral surface of the rotor core.

Thus, the magnets form a rotating magnetic field with respect to the coil 1320 wound around the stator 1300. These magnets may be disposed such that N poles and S poles are alternately disposed in the circumferential direction with respect to the shaft 1500.

Accordingly, the rotor 1400 rotates due to an electrical interaction between the coil 1320 and the magnets, and, when the rotor 1400 rotates, the shaft 1500 is rotated to generate a driving force of the motor 1a.

Meanwhile, the rotor core of the rotor 1400 may be fabricated by coupling a plurality of divided cores or may be fabricated in the form of a single core formed as a single container. Here, the rotor core may be implemented in the form in which a plurality of plates having a shape of a circular thin steel plate are stacked.

As shown in FIG. 11, the shaft 1500 may be rotatably supported in the housing 1100 due to the bearings 10. In addition, the shaft 1500 may rotate by being linked with the rotation of the rotor 1400.

The bus bar 1600 may be disposed above the stator 1300. In addition, the bus bar 1600 may be electrically connected to the coil 1320 of the stator 1300.

The bus bar 1600 may include a bus bar main body and a plurality of terminals disposed in the bus bar main body. Here, the bus bar main body may be a molded product formed through injection molding. In addition, each of the terminals may be electrically connected to the coil 1320 of the stator 1300.

The sensing part 1700 may detect a magnetic force of a sensing magnet installed to be rotatably linked with the rotor 1400 to determine a current position of the rotor 1400, thereby detecting rotation of the shaft 1500.

The sensing part 1700 may include a sensing magnet assembly 710 and a PCB 720.

The sensing magnet assembly 710 is coupled to the shaft 1500 to be linked with the rotor 1400 to detect a position of the rotor 1400. In this case, the sensing magnet assembly 710 may include a sensing magnet and a sensing plate. The sensing magnet may be coaxially coupled to the sensing plate.

The sensing magnet may include a main magnet disposed adjacent to a hole forming an inner circumferential surface in the circumferential direction and a sub-magnet formed at an edge of the main magnet. The main magnet may be arranged in the same manner as a drive magnet inserted into the rotor 1400 of the motor. The sub-magnet is more segmented than the main magnet and formed as many poles. Thus, a rotation angle may be further divided and measured, and driving of the motor may be made smoother.

The sensing plate may be formed of a metal material in the form of a disc. The sensing magnet may be coupled to an upper surface of the sensing plate. Further, the sensing plate may be coupled to the shaft 1500. Here, a hole through which the shaft 1500 passes is formed in the sensing plate.

A sensor for detecting a magnetic force of the sensing magnet may be disposed on the PCB 720. In this case, the sensor may be provided as a Hall IC. In addition, the sensor may generate a sensing signal by detecting a variation in an N pole and an S pole of the sensing magnet.

Third Embodiment

Figure 26:
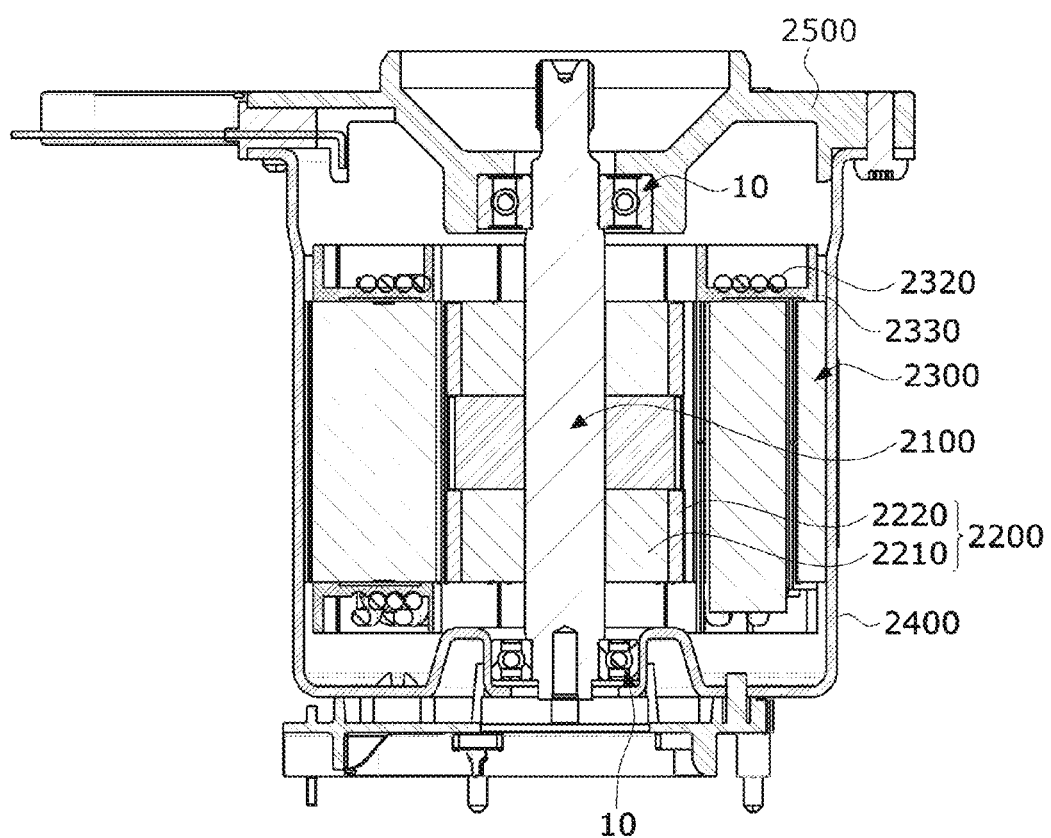
FIG. 26 is a side cross-sectional view illustrating a motor according to a third embodiment.

FIG. 26 is a side cross-sectional view illustrating a motor according to a third embodiment.

Referring to FIG. 26, the motor according to the third embodiment may include a shaft 2100, a rotor 2200, and a stator 2300. In addition, the motor according to the third embodiment may include a housing 2400 and a cover 2500.

The shaft 2100 may be coupled to the rotor 2200. When an electromagnetic interaction occurs in the rotor 2200 and the stator 2300 through a supply of a current, the rotor 2200 rotates and thus the shaft 2100 is rotated by being linked with the rotation of the rotor 1400. Here, the bearings 10 may be disposed on an outer circumferential surface of the shaft 2100. In addition, the shaft 2100 may be connected to a steering shaft of a vehicle to transmit power to the steering shaft.

The rotor 2200 rotates due to an electrical interaction with the stator 2300.

The rotor 2200 may include a rotor core 2210 and a magnet 2220. The rotor core 2210 may be implemented in a shape in which a plurality of plates in the form of a circular thin steel plate are stacked or may be implemented as a single container. A hole to which the shaft 2100 is coupled may be disposed in a center of the rotor core. A protrusion guiding the magnet 2220 may protrude from an outer circumferential surface of the rotor core 2210. The magnet 2220 may be bonded to the outer circumferential surface of the rotor core 2210. A plurality of magnets 2220 may be disposed along a circumference of the rotor core 2210 at regular intervals. The rotor 2200 and the stator 2300 may be accommodated in the housing 2400.

Figure 27:
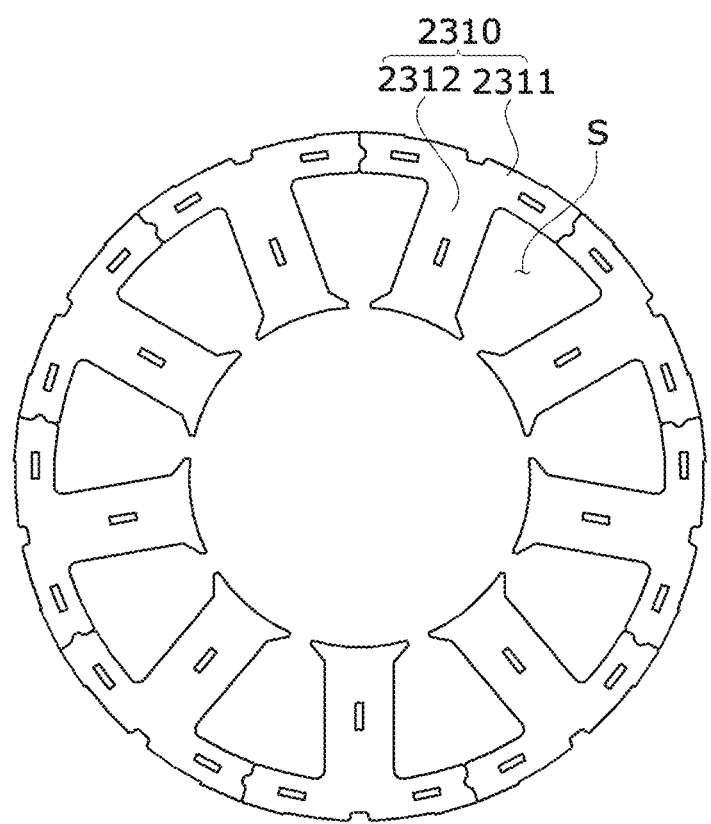
FIG. 27 is a diagram illustrating a stator core of a stator shown in FIG. 26.

FIG. 27 is a diagram illustrating the stator core of the stator shown in FIG. 26.

Referring to FIGS. 26 and 27, the stator 2300 includes a stator core 2310. The stator core 2310 may be divided into a yoke 2311 and teeth 2312. The tooth 2312 protrudes from an inner circumferential surface of the yoke 2311 in a center direction of the rotor core 2210. The plurality of teeth 2312 may be disposed, and the yoke 2311 may be divided for each tooth 2312. The divided yokes 2311 are coupled to and assembled with each other. A slot S in which the wound coil 2320 is located is provided between the teeth 2312.

Figure 28:
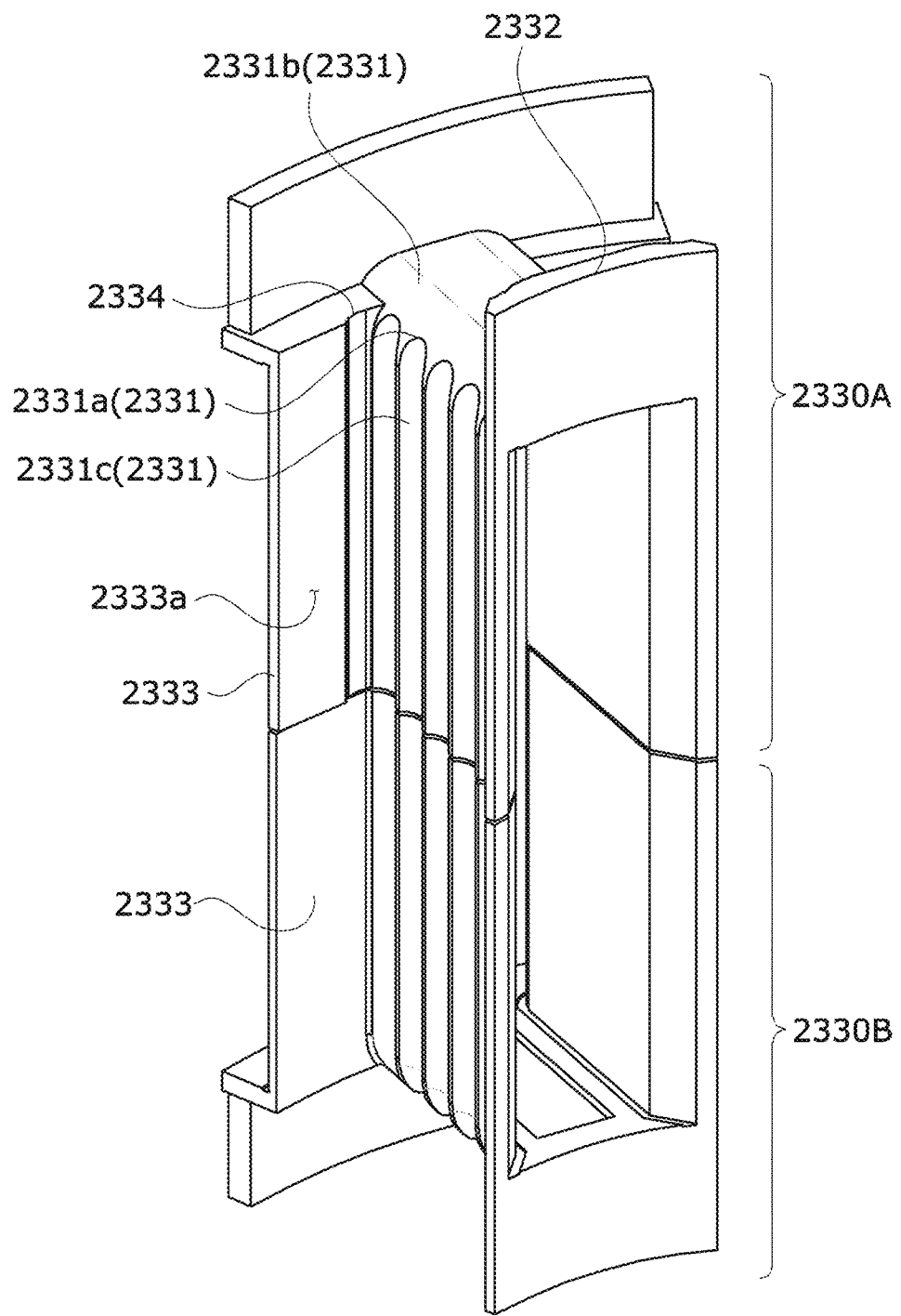
FIG. 28 is a diagram illustrating an insulator of the motor according to the third embodiment.
Figure 29:
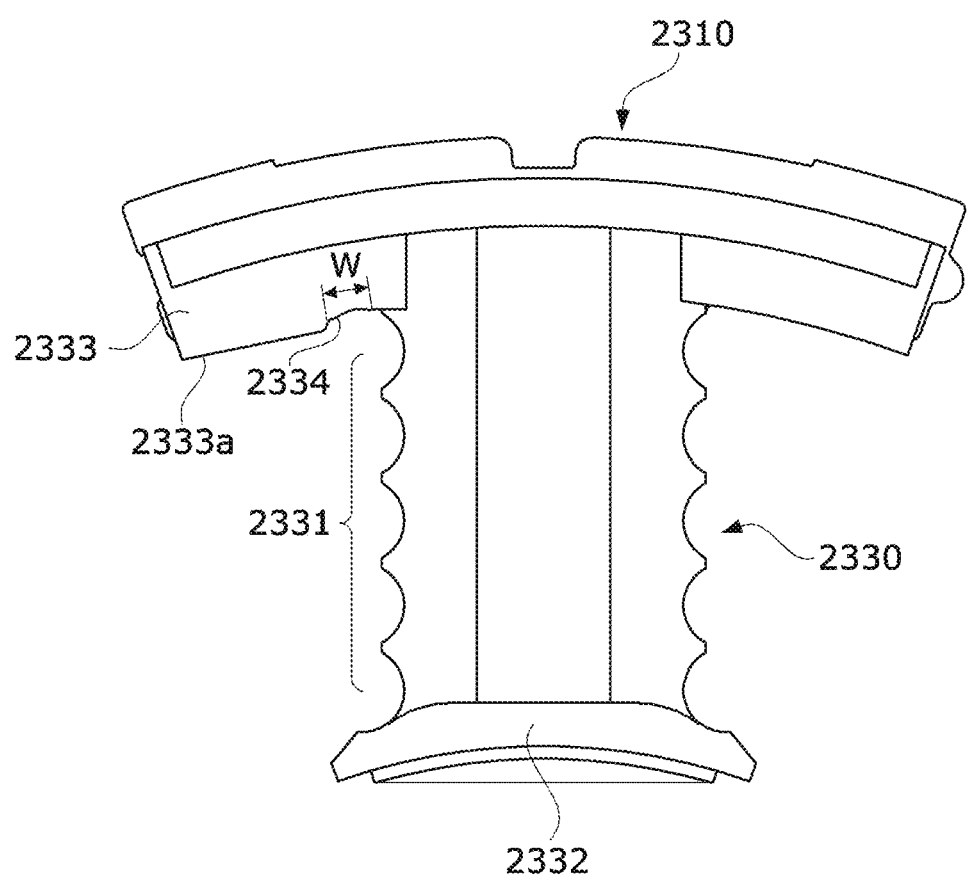
FIG. 29 is a diagram illustrating an insulator mounted on teeth of the motor according to the third embodiment.

FIG. 28 is a diagram illustrating an insulator, and FIG. 29 is a diagram illustrating the insulator installed in the teeth.

Referring to FIGS. 28 and 29, the stator 2300 includes an insulator 2330. The insulator 2330 is disposed on the tooth 2312. The insulator 2330 insulates the coil 2320 from the stator core 2310. The insulator 2330 may include a winding portion 2331, an inner guide 2332, and an outer guide 2333. The coil 2320 is wound around the winding portion 2331. The winding portion 2331 may include a seating groove 2331a. The seating groove 2331a is formed to be concave in the winding portion 2331. The seating groove 2331a guides a winding and determines a seating position of the coil 2320.

A groove 2334 is disposed at a boundary between the winding portion 2331 and an inner surface 2333a of the outer guide 2333. The groove 2334 is for fixing a last turn of the coil 2320. The groove 2334 is disposed to extend in a height direction of the insulator 2330. The insulator 2330 may be divided into an upper insulator 2330A and a lower insulator 2330B. In this case, the groove 2334 may be disposed in only the upper insulator 2330A. This is because the last turn of the coil 2320 passes over an upper side of the stator core 2310. However, the present invention is not limited thereto. The groove 2334 may be disposed in only the lower insulator 2330B. This is a case in which the last turn of the coil 2320 passes over a lower side of the stator core 2310. Alternatively, the groove 2334 may be disposed in both the upper insulator 2330A and the lower insulator 2330B. This has an advantage of increasing compatibility of parts by forming the upper insulator 2330A and the lower insulator 2330B as the same shape.

Meanwhile, the groove 2334 is disposed to be concave in the inner surface 2333a of the outer guide 2333 to secure a space in which the last turn of the coil 2320 is caught. The groove 2334 may be formed from an upper end to a lower end of the inner surface of the outer guide 2333, but the present invention is not limited thereto, and the groove 2334 may be formed to have a predetermined length starting from the upper end of the inner surface of the outer guide 2333 to not reach the lower end thereof. In FIG. 29, the groove 2334 has been illustrated as being located at a left side with respect to the winding portion 2331, but the groove 2334 may be implemented as being located at a right side. Alternatively, the groove 2334 may be formed at both the left side and the right side with respect to the winding portion 2331.

The winding portion 2331 includes an upper surface 2331b and side surfaces 2331c. The side surfaces 2331c are bent and extend from both sides of the upper surface 2331b. The seating groove 2331a is disposed to be long in the side surface 2331c. The groove 2334 is disposed adjacent to a boundary between the side surface 2331c and the inner surface 2333a of the outer guide 2333. Alternatively, the groove 2334 may be disposed at a boundary between the side surface 2331c and the inner surface 2333a of the outer guide 2333. In addition, a width W of the groove 2334 is preferably formed to be smaller than the diameter of the coil 2320. This is to increase a fixing force of the last turn of the coil 2320.

Figure 30:
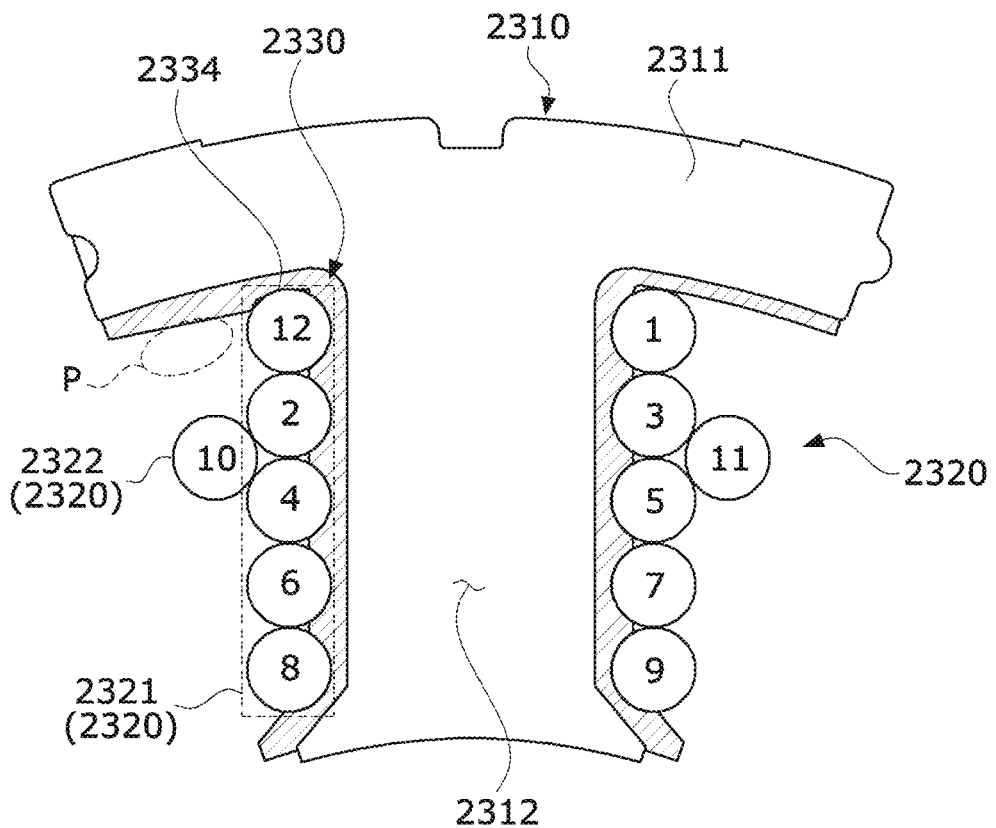
FIG. 30 is a diagram illustrating a stator core around which a coil of the motor is wound according to the third embodiment.
Figure 31:
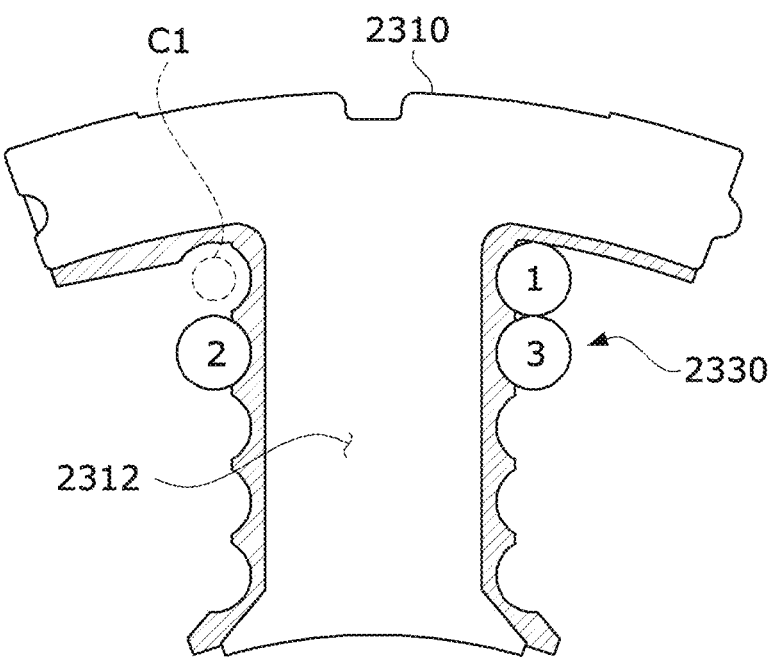
FIG. 31 is a diagram illustrating a winding order of the coil of the motor according to the third embodiment.

FIG. 30 is a diagram illustrating the stator core around which the coil is wound, and FIG. 31 is a diagram illustrating a winding order of the coil.

FIG. 30 illustrates a transverse cross section of the coil 2320 wound in six turns that shows positions of the coil 2320 as numbers from 1 to 12 in the drawing according to a winding order of the coil 2320 with respect to the transverse cross section. Referring to FIGS. 30 and 31, a shape of the coil 2320, which is discriminated on the transverse cross section, is symmetrically disposed with respect to the teeth 2312. In addition, a first turn and a last turn among a plurality of turns of the coil 2320 are symmetrically disposed with respect to the teeth 2312. The coil 2320 may be wound in six turns. In addition, the coil 2320 may be stacked in a first layer and the second layer.

A position of a first coil cross section disposed at an outermost side of a right side of FIG. 30 represents the first turn of the coil 2320. A winding from the first coil cross section to a second coil cross section is the first turn. In this case, as shown in C1 of FIG. 31, a region disposed at the outermost side of the left side is empty, and the winding proceeds to direct the second coil section to be located in the next region. A coil 2321 disposed in a first layer proceeds to a fourth turn, and a coil 2322 disposed in a second layer by a fifth turn is stacked on the coil 2321 disposed in the first layer. Owing to the fifth turn, a tenth coil cross section is located in the second layer. In addition, a twelfth coil cross section is disposed in the outermost region C1 of the first layer by a last turn that is a sixth turn.

The last turn of the coil 2320 is to pass over the next adjacent tooth 2312 so as to be wound therearound. Therefore, it is a region in which the movement of the coil 2320 occurs. In addition, the last turn of the coil 2320 is located at the outermost side. Since the last turn is adjacent to both sides of the yoke 2311, when adjacent yokes 2311 are mutually coupled and the last turn of the coil 2320 is located in the second layer, interference between the coils 2320 may occur. On the other hand, when the last turn of the coil 2320 is located in the first layer, a space P in FIG. 30 is secured so that interference between coils wound around an adjacent tooth 2312 is inhibited. Meanwhile, the groove 2334 is located at a position at which the last turn of the coil 2320 passes over. That is, the groove 2334 is functionally disposed adjacent to the outermost region of the first layer. While the last turn of the coil 2320 passes over, the groove 2334 fixes the coil 2320 so as to inhibit the movement and clearance of the coil 2320 from occurring.

Figure 32A:
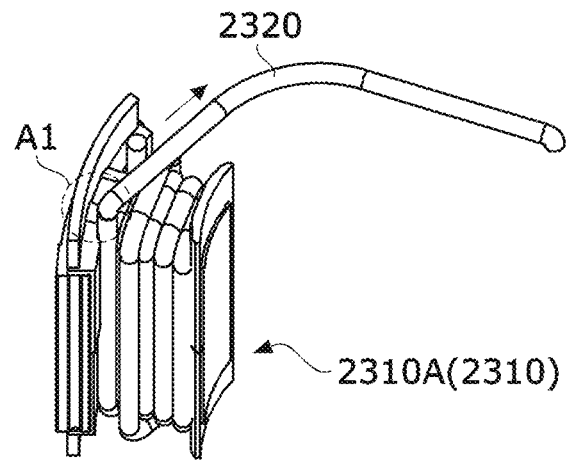
FIGS. 32A-32C are diagrams illustrating a process of winding the coil of the motor according to the third embodiment.
Figure 32B:
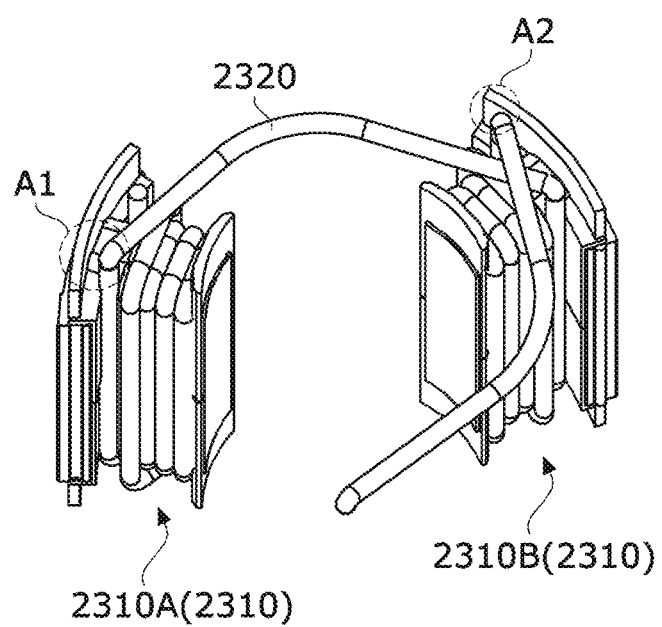
Figure 32C:
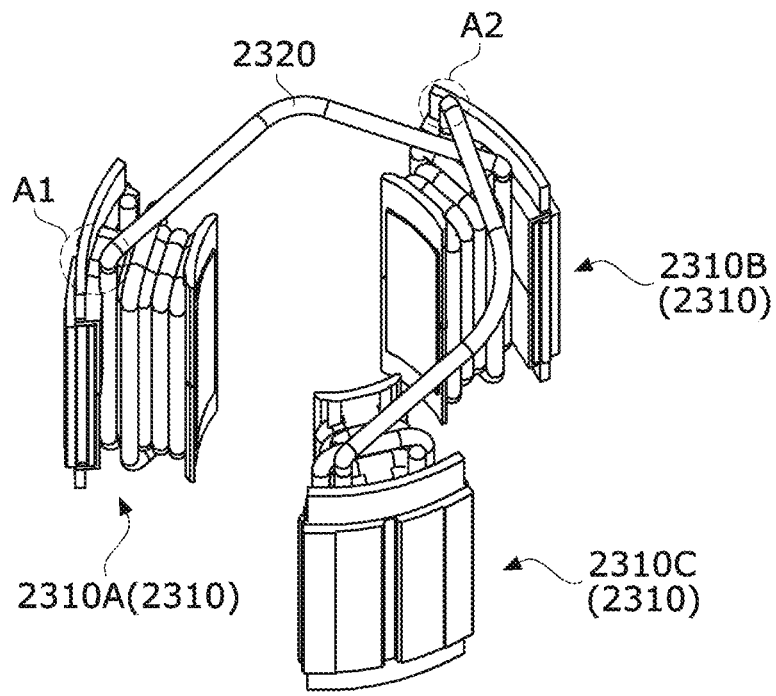

FIGS. 32A-32C are diagrams illustrating a process of winding a coil. Here, FIG. 32A is a diagram illustrating a coil wound around a first divided core, FIG. 32B is a diagram illustrating a coil wound around a second divided core, and FIG. 32C is a diagram illustrating a coil wound around a third divided core.

Referring to FIGS. 32A-32C, each of a first divided core 2310A, a second divided core 2310B, and a third divided core 2310C corresponds to any one among a plurality of divided cores forming the stator 2300.

As shown in FIG. 32A, in a state of forming a starting end, the coil 2320 is wound around the first divided core 2310A. The coil 2320 is electrically connected to any one among U, V, and W-phase power sources. The last turn of the coil 2320 is completed in a region indicated by A1 in FIGS. 32A-32C, and the coil 2320 passes over the second divided core 2310B. In this case, the groove 2334 of FIG. 30 guides and, simultaneously, fixes the coil 2320.

In addition, as shown in FIG. 32B, the coil 2320 is wound around the second divided core 2310B. The last turn of the coil 2320 is completed in a region indicated by A2 in FIGS. 32A-32C, and the coil 2320 passes over the third divided core 2310C.

As shown in FIG. 32C, the coil 2320 is wound around the third divided core 2310C to form a final end so that the winding of the coil 2320 is completed.

The number of teeth 2312 may be n, one coil 2320 is wound around n/m teeth 2312, and m coils 2320 may be connected in series. Here, when n is nine and m is three, one coil 2320 is wound around the three divided cores 2310A, 2310B, and 2310C. In such a manner, three coils 2320 are wound around the three divided cores 2310A, 2310B, and 2310C to form the stator 2300 including a total of nine divided cores. The three coils 2320 may be connected to the U, V, and W-phase power sources, and the three coils 2320 may be connected in series to each other.

Figure 33:
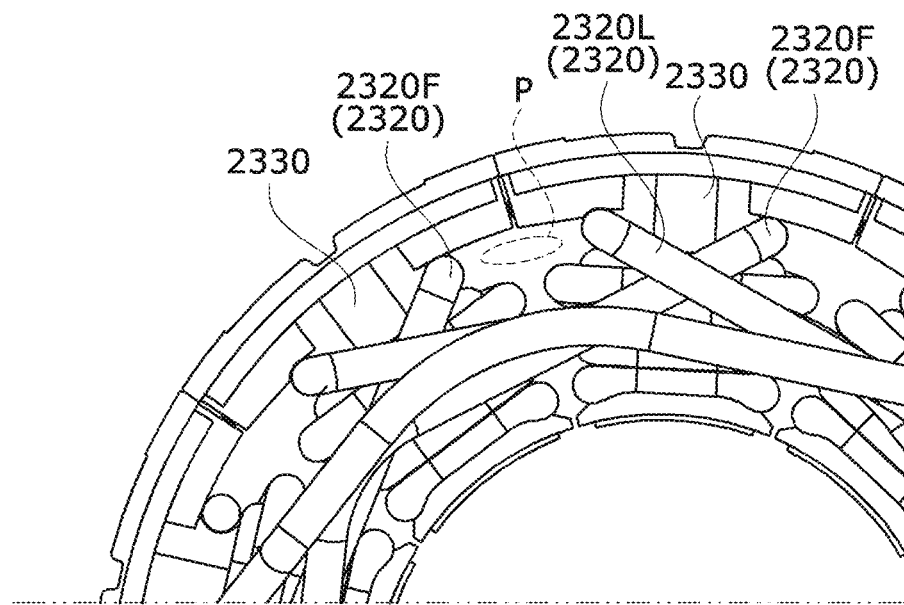
FIG. 33 is a diagram illustrating a wound state of the coil of the motor according to the third embodiment.

FIG. 33 is a diagram illustrating a winding state of the coil.

Referring to FIG. 33, a coil 2320L in the last turn crosses over a coil 2320F of the first turn to be wound around a tooth 2312 located at a right side in the drawing. The coil 2320L in the last turn is in a state of facing the coil 2320F of the first turn wound around an adjacent tooth 2312 located at a left side in the drawing. Since the coil 2320L in the last turn is disposed in the first layer and the coil 2320F of the first turn of the adjacent tooth 2312 is also disposed in the first layer, a space P in FIG. 33 is secured. Owing to the space P, when the divided cores are assembled, interference between the coils is eliminated.

Although the description has been made with reference to the embodiments of the present invention, it should be understood that various alternations and modifications of the present invention can be devised by those skilled in the art to which the present invention pertains without departing from the spirit and scope of the present invention, which are defined by the appended claims. Further, it should be construed that differences relating to these various alternations and modifications will fall within the scope of the present invention, which are defined by the appended claims.

DESCRIPTION OF REFERENCE NUMERALS

1, 1*a*: motor, 10: bearing, 100, 1100, 2400: housing, 200, 1200, 2500: cover, 300, 1400, 2200: rotor, 400, 1300, 2300: stator, 410, 1310, 2310: stator core, 420, 1330, 2330: insulator, 430, 1320, 2320: coil, 440, 1340: insulating member, 500, 1500, 2100: shaft, 600, 1600: bus bar, 700, 1700: sensor part

The invention claimed is:

1. A motor comprising:
   a shaft;
   a rotor coupled to the shaft; and
   a stator disposed at an outer side of the rotor,
   wherein the stator includes a stator core, an insulator coupled to the stator core, a coil disposed on the insulator, and an insulating member disposed at one side of the coil,
   wherein the insulator includes a body, a first guide disposed at one side of the body, a second guide disposed at the other side of the body, a first protrusion formed on one side of the first guide, and a second protrusion formed on one side of the second guide,
   wherein one side of the insulating member is disposed between the first protrusion and the coil, and another side thereof is disposed between the second protrusion and the coil, and
   wherein the first protrusion comprises a curved surface in contact with the insulating member and having a curvature corresponding to that of the insulating member.

2. The motor of claim 1, wherein the insulating member includes a curved surface.

3. The motor of claim 2, wherein the insulating member includes a region in which a curvature of the curved surface is decreased in a direction away from a center of the stator core in a radial direction.

4. The motor of claim 3, wherein:
   one surface of the first protrusion in contact with the insulating member includes a first curved surface corresponding to the curvature of the insulating member; and
   one surface of the second protrusion in contact with the insulating member includes a second curved surface corresponding to the curvature of the insulating member.

5. The motor of claim 4, wherein a curvature of the first curved surface is greater than that of the second curved surface.

6. The motor of claim 1, wherein the insulating member is disposed farther outward than the coil wound around an outermost side of the body with respect to a circumferential direction.

7. The motor of claim 6, wherein a gap (G) between one region of the coil wound around an outer side of the body by a last turn and an end portion of the second protrusion is 0.95 to 1.0 times a diameter of the coil.

8. The motor of claim 1, wherein:
   the first protrusion is disposed to face the second protrusion; and
   the first protrusion and the second protrusion are located in the same circumferential direction with respect to the body.

9. The motor of claim 1, wherein the first protrusion and the second protrusion are in contact with the insulating member.

10. The motor of claim 1, wherein the second protrusion is disposed on an imaginary line connecting a center of the stator core to one end of the first protrusion.

11. The motor of claim 1, wherein an upper surface of the body, an upper surface of the first protrusion, and an upper surface of the second protrusion are disposed coplanar with each other.

12. The motor of claim 11, wherein an upper portion of the insulating member is disposed below the upper surface of the first protrusion.

13. The motor of claim 1, wherein the stator comprises a plurality of unit stators arranged in a circular shape to form the stator, and
   wherein the first protrusion and the insulating member are disposed in a clockwise direction with respect to the stator.

14. The motor of claim 1, wherein:
   the first protrusion is formed as a plurality of first protrusions, and the second protrusion is formed as a plurality of second protrusions;
   first protrusions of the plurality of first protrusions are disposed at an upper side and a lower side, respectively, of the first guide; and
   second protrusions of the plurality of second protrusions are disposed at an upper side and a lower side, respectively, of the second guide.

15. The motor of claim 1, wherein:

the first protrusion and the second protrusion are formed to extend to be long in a vertical direction; and inner surfaces of the first protrusion and the second protrusion, which are in contact with the insulating member, have a slope inclined at a predetermined angle.

16. The motor of claim 1, wherein a radial direction length of the insulating member is greater than a distance (D1) between the first guide and the second guide.

17. A stator comprising:

a stator core;

a coil wound around the stator core; and an insulator disposed between the stator core and the coil, wherein the insulator includes:

a body around which the coil is wound;

a first guide protruding from an inner side of the body;

a second guide protruding from an outer side of the body;

a first protrusion protruding outward from a side surface of the first guide;

a second protrusion protruding inward from an inner surface of the second guide; and an insulating member disposed between the first guide and the second guide in a radial direction, wherein the insulating member is curved in a circumferential direction due to the first protrusion and the second protrusion, and wherein the first protrusion comprises a curved surface in contact with the insulating member and having a curvature corresponding to that of the insulating member.

18. The stator of claim 17, wherein:

the insulating member is formed in a plate shape; and as a radial direction width of the insulating member is increased, a protruding length of the first protrusion is reduced.

19. A motor comprising:

a housing;

a stator disposed in the housing;

a rotor disposed on the stator;

a shaft coupled to the rotor; and a cover disposed on the housing, wherein the stator includes:

a plurality of stator units;

an insulating member configured to insulate the plurality of stator units; and a first guide portion configured to guide an arrangement of the insulating member, wherein each stator unit of the plurality of stator units includes:

a stator core;

a coil; and an insulator disposed between the stator core and the coil, wherein the insulator of each stator unit of the plurality of stator units includes:

a main body around which the coil is wound;

an inner guide disposed at an inner side of the main body;

an outer guide disposed at an outer side of the main body; and a first protrusion protruding from one region of a side surface of the inner guide in a circumferential direction, and wherein the first guide portion is a groove formed due to the first protrusions of adjacent stator units, of the plurality of stator units, disposed adjacent to each other and in contact with each other.

20. The stator of claim 19, wherein:

the insulator of each stator unit of the plurality of stator units includes a groove disposed at an inner side of the outer guide;

the coil of each stator unit of the plurality of stator units is wound around the main body in a plurality of turns to form a plurality of layers;

a last turn among the plurality of turns of each coil is disposed in a first layer closest to a tooth of the stator core among the plurality of layers; and the last turn of the coil of at least one stator unit of the plurality of stator units is disposed in the groove.

* * * * *